US012694875B2

(12) United States Patent
Abhyanker et al.

(10) Patent No.: US 12,694,875 B2
(45) Date of Patent: Jul. 28, 2026

(54) METHOD, DEVICE AND SYSTEM OF CONTEXTUAL AND USER LOCATION BASED OPERATIONAL EXECUTION VIA A GENERATIVE ARTIFICIAL INTELLIGENCE (AI) COMPUTING PLATFORM IN RESPONSE TO USER INTERACTION THEREWITH

(71) Applicants: Raj Abhyanker, Cupertino, CA (US); Mircea Voskerician, Palo Alto, CA (US)

(72) Inventors: Raj Abhyanker, Cupertino, CA (US); Mircea Voskerician, Palo Alto, CA (US)

( * ) Notice: Subject to any disclaimer, the term of this patent is extended or adjusted under 35 U.S.C. 154(b) by 285 days.

(21) Appl. No.: 18/540,850

(22) Filed: Dec. 14, 2023

(65) Prior Publication Data

US 2025/0190713 A1     Jun. 12, 2025

Related U.S. Application Data

(60) Provisional application No. 63/608,394, filed on Dec. 11, 2023, provisional application No. 63/607,693, (Continued)

(51) Int. Cl.
*G10L 15/22*        (2006.01)
*G06F 16/63*        (2019.01)
(Continued)

(52) U.S. Cl.
CPC .............. *G10L 15/22* (2013.01); *G06F 16/63* (2019.01); *G06F 16/68* (2019.01); *G06F 16/687* (2019.01);
(Continued)

(58) Field of Classification Search
None
See application file for complete search history.

(56)                References Cited

U.S. PATENT DOCUMENTS

| | | | |
|---|---|---|---|
| 3,417,526 A | 12/1968 | Wyburn | |
| 3,732,649 A | 5/1973 | Mehran | |
| (Continued) | | | |

FOREIGN PATENT DOCUMENTS

| | | | |
|---|---|---|---|
| AU | 2020376819 B2 | 4/2023 | |
| CN | 106027366 A | 10/2016 | |
| (Continued) | | | |

OTHER PUBLICATIONS

"The Civic Engagement Social Network", by Hiago, Found Online on [Dec. 15, 2023] Link: https://hiago.com/.
(Continued)

*Primary Examiner* — Richard Z Zhu
(74) *Attorney, Agent, or Firm* — LegalForce RAPC Worldwide

(57)                ABSTRACT

A method, a device and/or a system of a generative AI computing platform implemented using a processor communicatively coupled to a memory is disclosed. In accordance therewith, context relevant to an interaction of a user with the generative AI computing platform is determined from an input thereto indicative of the interaction of the user. In addition to the context, a current location of the user is determined from the input, data associated with the input and/or metadata of the user outside the input and the data associated with the input. Also, one or more operation(s) contextually relevant to and reflective of the determined context and the determined current location of the user is automatically executed as associated with a response to the interaction of the user.

20 Claims, 8 Drawing Sheets

PUBLIC ENGAGEMENT
COMPUTING SYSTEM
100

Related U.S. Application Data filed on Dec. 8, 2023, provisional application No. 63/607,699, filed on Dec. 8, 2023, provisional application No. 63/607,554, filed on Dec. 7, 2023.

(51) Int. Cl.

| | |
|---|---|
| G06F 16/68 | (2019.01) |
| G06F 16/687 | (2019.01) |
| G06F 40/40 | (2020.01) |
| G06F 40/58 | (2020.01) |
| G06Q 30/0251 | (2023.01) |
| G10L 15/00 | (2013.01) |
| G10L 15/06 | (2013.01) |
| G10L 15/18 | (2013.01) |
| H04L 51/21 | (2022.01) |
| H04L 67/306 | (2022.01) |
| H04W 4/02 | (2018.01) |

(52) U.S. Cl.
CPC .............. *G06F 40/40* (2020.01); *G06F 40/58* (2020.01); *G06Q 30/0271* (2013.01); *G10L 15/005* (2013.01); *G10L 15/063* (2013.01); *G10L 15/1815* (2013.01); *H04L 51/21* (2022.05); *H04L 67/306* (2013.01); *H04W 4/02* (2013.01); *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 5,349,636 | A | 9/1994 | Irribarren |
| 5,671,570 | A | 9/1997 | Kaufman et al. |
| 6,026,368 | A | 2/2000 | Brown et al. |
| 6,061,646 | A | 5/2000 | Martino et al. |
| 6,289,326 | B1 | 9/2001 | LaFleur |
| 6,594,652 | B1 | 7/2003 | Sunaga et al. |
| 6,609,118 | B1 | 8/2003 | Khedkar et al. |
| 6,691,153 | B1 | 2/2004 | Hanson et al. |
| 6,745,196 | B1 | 6/2004 | Colyer et al. |
| 6,810,111 | B1 | 10/2004 | Hunter et al. |
| 6,842,877 | B2 | 1/2005 | Robarts et al. |
| 7,113,088 | B2 | 9/2006 | Frick et al. |
| 7,188,079 | B2 | 3/2007 | Arnett et al. |
| 7,548,930 | B2 | 6/2009 | Kobza et al. |
| 7,600,017 | B2 | 10/2009 | Holtzman et al. |
| 7,668,710 | B2 | 2/2010 | Doyle |
| 7,904,515 | B2 | 3/2011 | Ambati et al. |
| 7,966,567 | B2 | 6/2011 | Abhyanker |
| 8,015,183 | B2 | 9/2011 | Frank |
| 8,095,430 | B2 | 1/2012 | Abhyanker |
| 8,126,832 | B2 | 2/2012 | Spring et al. |
| 8,135,693 | B2 | 3/2012 | Brazier et al. |
| 8,145,645 | B2 | 3/2012 | Delli Santi et al. |
| 8,160,970 | B2 | 4/2012 | Allsop |
| 8,161,110 | B2 | 4/2012 | Verhaeghe et al. |
| 8,190,357 | B2 | 5/2012 | Abhyanker et al. |
| 8,204,776 | B2 | 6/2012 | Abhyanker |
| 8,279,219 | B2 | 10/2012 | Ghazali |
| 8,296,383 | B2 | 10/2012 | Lindahl |
| 8,412,565 | B2 | 4/2013 | Müller |
| 8,433,609 | B2 | 4/2013 | Abhyanker |
| 8,660,897 | B2 | 2/2014 | Abhyanker |
| 8,676,680 | B2 | 3/2014 | Humphries et al. |
| 8,732,091 | B1 | 5/2014 | Abhyanker |
| 8,732,605 | B1 | 5/2014 | Falaki |
| 8,738,437 | B2 * | 5/2014 | Gailey ................. H04W 4/029 705/14.66 |
| 8,738,545 | B2 | 5/2014 | Abhyanker |
| 8,769,393 | B1 | 7/2014 | Abhyanker |
| 8,793,324 | B1 | 7/2014 | Schabes et al. |
| 8,842,156 | B1 | 9/2014 | Alekhin |
| 8,863,245 | B1 | 10/2014 | Abhyanker |

| | | | |
|---|---|---|---|
| 8,874,489 | B2 | 10/2014 | Abhyanker |
| 8,904,295 | B2 | 12/2014 | Whalin et al. |
| 8,965,409 | B2 | 2/2015 | Abhyanker |
| 9,002,754 | B2 | 4/2015 | Abhyanker |
| 9,003,049 | B1 | 4/2015 | Simoes |
| 9,064,288 | B2 | 6/2015 | Abhyanker |
| 9,070,101 | B2 | 6/2015 | Abhyanker |
| 9,071,367 | B2 | 6/2015 | Abhyanker et al. |
| 9,076,349 | B2 | 7/2015 | Gupta |
| 9,122,693 | B2 | 9/2015 | Blom et al. |
| 9,134,875 | B2 | 9/2015 | Falaki et al. |
| 9,160,692 | B2 | 10/2015 | Socolof |
| 9,263,032 | B2 | 2/2016 | Meruva |
| 9,268,398 | B2 | 2/2016 | Tipirneni |
| 9,451,020 | B2 | 9/2016 | Liu et al. |
| 9,471,567 | B2 | 10/2016 | Duyaguit |
| 9,479,392 | B2 | 10/2016 | Anderson et al. |
| 9,495,331 | B2 | 11/2016 | Govrin et al. |
| 9,514,435 | B2 | 12/2016 | Nguyen |
| 9,533,759 | B2 | 1/2017 | Jones et al. |
| 9,584,526 | B2 | 2/2017 | Williams et al. |
| 9,654,425 | B2 | 5/2017 | Heiferman et al. |
| 9,697,822 | B1 | 7/2017 | Naik et al. |
| 9,754,334 | B2 | 9/2017 | Pearcy et al. |
| 9,836,049 | B1 | 12/2017 | Tu |
| 9,865,280 | B2 | 1/2018 | Sumner et al. |
| 9,894,476 | B2 | 2/2018 | Fraccaroli |
| 9,898,170 | B2 | 2/2018 | Bufe et al. |
| 9,904,709 | B2 * | 2/2018 | Krumm ............... G06F 16/2457 |
| 9,947,321 | B1 | 4/2018 | Jochumson |
| 9,960,809 | B2 | 5/2018 | Gross et al. |
| 9,978,022 | B2 | 5/2018 | Tseng et al. |
| 10,007,959 | B2 | 6/2018 | Wood |
| 10,031,721 | B2 | 7/2018 | Bucsa et al. |
| 10,089,639 | B2 | 10/2018 | Kannan et al. |
| 10,152,681 | B2 | 12/2018 | Stephan et al. |
| 10,165,081 | B2 | 12/2018 | Dagostino et al. |
| 10,192,275 | B2 | 1/2019 | Smith |
| 10,194,029 | B2 | 1/2019 | Conway et al. |
| 10,220,517 | B2 | 3/2019 | Delazari Binotto et al. |
| 10,235,025 | B2 | 3/2019 | Falaki et al. |
| 10,269,457 | B2 | 4/2019 | Palter |
| 10,298,410 | B2 | 5/2019 | Whalin et al. |
| 10,298,535 | B2 | 5/2019 | Dange |
| 10,319,054 | B2 | 6/2019 | Smith |
| 10,324,466 | B2 | 6/2019 | Erickson et al. |
| 10,334,158 | B2 | 6/2019 | Gove |
| 10,382,379 | B1 * | 8/2019 | Zhang ................. G06Q 10/107 |
| 10,460,406 | B1 | 10/2019 | Humphries et al. |
| 10,521,943 | B1 | 12/2019 | Phillips et al. |
| 10,534,521 | B2 | 1/2020 | Tolia et al. |
| 10,546,332 | B2 * | 1/2020 | Carlson ............. G06Q 30/0222 |
| 10,564,711 | B2 | 2/2020 | Yellamraju et al. |
| 10,565,665 | B2 | 2/2020 | Zabala Rodriguez |
| 10,614,487 | B1 | 4/2020 | Tushinskiy |
| 10,664,504 | B2 | 5/2020 | Chen et al. |
| 10,691,698 | B2 | 6/2020 | Chandrasekaran et al. |
| 10,693,669 | B2 | 6/2020 | Dave et al. |
| 10,699,703 | B2 | 6/2020 | Green et al. |
| 10,701,014 | B2 | 6/2020 | Perazzo et al. |
| 10,714,084 | B2 | 7/2020 | Engles et al. |
| 10,836,508 | B2 | 11/2020 | Overall et al. |
| 10,847,152 | B2 | 11/2020 | Oh et al. |
| 10,873,557 | B2 | 12/2020 | Goenka et al. |
| 10,922,483 | B1 | 2/2021 | Shevchenko et al. |
| 10,923,120 | B2 | 2/2021 | Lin et al. |
| 10,928,917 | B2 | 2/2021 | Jain et al. |
| 10,977,617 | B2 | 4/2021 | Tseretopoulos et al. |
| 11,003,864 | B2 | 5/2021 | Wang |
| 11,074,447 | B1 | 7/2021 | Fox et al. |
| 11,080,023 | B2 | 8/2021 | Bodin et al. |
| 11,127,039 | B2 | 9/2021 | May et al. |
| 11,144,681 | B2 | 10/2021 | Benjamin et al. |
| 11,145,212 | B2 | 10/2021 | Dupray et al. |
| 11,151,992 | B2 | 10/2021 | Cui et al. |
| 11,157,706 | B2 | 10/2021 | Ayers et al. |
| 11,196,545 | B2 | 12/2021 | Santilli et al. |
| 11,221,823 | B2 | 1/2022 | Yoganandan et al. |
| 11,244,412 | B1 | 2/2022 | Phillips et al. |

(56) References Cited

U.S. PATENT DOCUMENTS

| | | | |
|---|---|---|---|
| 11,263,678 B2 | 3/2022 | Connolly et al. | |
| 11,270,397 B2 | 3/2022 | Yang et al. | |
| 11,341,962 B2 | 5/2022 | Poltorak | |
| 11,355,228 B2 | 6/2022 | Appelbaum et al. | |
| 11,361,211 B2 | 6/2022 | Manaharlal Kakkad et al. | |
| 11,366,857 B2 | 6/2022 | Rodriquez et al. | |
| 11,373,100 B2 | 6/2022 | Wu et al. | |
| 11,375,380 B1 | 6/2022 | Abhyanker et al. | |
| 11,386,818 B2 | 7/2022 | Salem | |
| 11,430,447 B2 | 8/2022 | Sinha et al. | |
| 11,431,660 B1 | 8/2022 | Leeds et al. | |
| 11,507,581 B2 | 11/2022 | Roytman et al. | |
| 11,509,812 B2 | 11/2022 | Cui et al. | |
| 11,515,931 B2 | 11/2022 | Babich | |
| 11,537,964 B1 | 12/2022 | Cecilian, Jr. et al. | |
| 11,595,333 B2 | 2/2023 | Stillwell et al. | |
| 11,645,547 B2 | 5/2023 | Tian et al. | |
| 11,657,429 B1 | 5/2023 | Meeboer | |
| 11,665,127 B2 | 5/2023 | Salter et al. | |
| 11,675,996 B2 | 6/2023 | Claire | |
| 11,676,228 B2 | 6/2023 | Copley et al. | |
| 11,687,800 B2 | 6/2023 | Bonutti et al. | |
| 11,756,536 B2 | 9/2023 | Sekine | |
| 11,782,959 B2 | 10/2023 | Strong et al. | |
| 11,782,997 B2 | 10/2023 | Marsh et al. | |
| 11,790,180 B2 | 10/2023 | Ayers et al. | |
| 11,803,764 B2 | 10/2023 | Beran et al. | |
| 11,819,737 B1 | 11/2023 | Wengreen | |
| 2002/0010584 A1 | 1/2002 | Schultz et al. | |
| 2002/0055924 A1 | 5/2002 | Liming | |
| 2002/0094868 A1 | 7/2002 | Tuck et al. | |
| 2003/0065512 A1 | 4/2003 | Walker | |
| 2003/0154213 A1 | 8/2003 | Ahn | |
| 2004/0042592 A1 | 3/2004 | Knott et al. | |
| 2004/0098264 A1 | 5/2004 | Bowater et al. | |
| 2004/0139049 A1 | 7/2004 | Hancock et al. | |
| 2005/0114703 A1 | 5/2005 | Allen et al. | |
| 2006/0085419 A1 | 4/2006 | Rosen | |
| 2006/0122896 A1 | 6/2006 | Parsley | |
| 2007/0143341 A1 | 6/2007 | Brownell et al. | |
| 2007/0219712 A1 | 9/2007 | Abhyanker | |
| 2008/0040137 A1 | 2/2008 | Lee et al. | |
| 2008/0083174 A1 | 4/2008 | Hersha | |
| 2008/0086356 A1 | 4/2008 | Glassman et al. | |
| 2008/0184122 A1 | 7/2008 | Grant et al. | |
| 2008/0229424 A1 | 9/2008 | Harris et al. | |
| 2008/0255901 A1 | 10/2008 | Carroll et al. | |
| 2008/0294747 A1 | 11/2008 | Abhyanker | |
| 2009/0024740 A1 | 1/2009 | Abhyanker | |
| 2009/0061883 A1 | 3/2009 | Abhyanker | |
| 2009/0063467 A1 | 3/2009 | Abhyanker | |
| 2009/0063991 A1 | 3/2009 | Baron et al. | |
| 2009/0222382 A1 | 9/2009 | Kobza et al. | |
| 2009/0228305 A1 | 9/2009 | Gustafsson et al. | |
| 2009/0228478 A1 | 9/2009 | Steichen | |
| 2010/0180001 A1* | 7/2010 | Hardt | H04L 12/189 |
| | | | 715/752 |
| 2011/0219071 A1 | 9/2011 | Vogel et al. | |
| 2011/0251874 A1 | 10/2011 | Banthia et al. | |
| 2012/0042266 A1 | 2/2012 | Sotropa | |
| 2012/0158527 A1* | 6/2012 | Cannelongo | H04N 21/2668 |
| | | | 707/748 |
| 2013/0042186 A1 | 2/2013 | Tranchina | |
| 2013/0232427 A1* | 9/2013 | Romero | H04L 65/403 |
| | | | 715/753 |
| 2013/0238515 A1 | 9/2013 | Ghazali | |
| 2013/0282360 A1* | 10/2013 | Shimota | G06Q 30/0241 |
| | | | 704/7 |
| 2013/0326375 A1 | 12/2013 | Barak et al. | |
| 2014/0007157 A1* | 1/2014 | Harrison | H04L 67/02 |
| | | | 725/32 |
| 2014/0057590 A1* | 2/2014 | Romero | G08B 25/08 |
| | | | 455/404.2 |
| 2014/0067395 A1 | 3/2014 | Balasubramanian et al. | |

| | | | |
|---|---|---|---|
| 2014/0108556 A1 | 4/2014 | Abhyanker | |
| 2014/0114866 A1 | 4/2014 | Abhyanker | |
| 2014/0123247 A1 | 5/2014 | Abhyanker | |
| 2014/0136328 A1 | 5/2014 | Abhyanker | |
| 2014/0136624 A1 | 5/2014 | Abhyanker | |
| 2014/0143004 A1 | 5/2014 | Abhyanker | |
| 2014/0143061 A1 | 5/2014 | Abhyanker | |
| 2014/0165091 A1 | 6/2014 | Abhyanker | |
| 2014/0200963 A1 | 7/2014 | Abhyanker | |
| 2014/0230030 A1 | 8/2014 | Abhyanker | |
| 2014/0358632 A1 | 12/2014 | Graff et al. | |
| 2015/0033153 A1 | 1/2015 | Knysz et al. | |
| 2015/0039691 A1 | 2/2015 | Sharma et al. | |
| 2015/0089399 A1 | 3/2015 | Megill et al. | |
| 2015/0089409 A1 | 3/2015 | Asseily et al. | |
| 2016/0078458 A1 | 3/2016 | Gold et al. | |
| 2016/0261647 A1 | 9/2016 | Yerli | |
| 2016/0358269 A1 | 12/2016 | Talanov | |
| 2017/0018275 A1 | 1/2017 | Gunn et al. | |
| 2017/0064033 A1 | 3/2017 | Stackel et al. | |
| 2017/0236094 A1 | 8/2017 | Shah | |
| 2017/0270547 A1 | 9/2017 | Poltz | |
| 2017/0308549 A1 | 10/2017 | Sims et al. | |
| 2018/0101760 A1 | 4/2018 | Nelson et al. | |
| 2018/0114237 A1 | 4/2018 | Kirk et al. | |
| 2018/0130462 A1 | 5/2018 | Kayama et al. | |
| 2018/0150749 A1 | 5/2018 | Wu et al. | |
| 2018/0294986 A1 | 10/2018 | Vidro et al. | |
| 2018/0315094 A1* | 11/2018 | Ashoori | G06Q 30/0269 |
| 2018/0319495 A1 | 11/2018 | Tu | |
| 2018/0349473 A1 | 12/2018 | Smith et al. | |
| 2018/0374108 A1 | 12/2018 | Kannan et al. | |
| 2019/0058682 A1 | 2/2019 | MacAskill et al. | |
| 2019/0066230 A1 | 2/2019 | Dange | |
| 2019/0080425 A1 | 3/2019 | Bui et al. | |
| 2019/0108448 A1 | 4/2019 | O'Malia et al. | |
| 2019/0199657 A1 | 6/2019 | Fawcett et al. | |
| 2019/0205000 A1 | 7/2019 | Raghavendran | |
| 2019/0213498 A1 | 7/2019 | Adjaoute | |
| 2019/0244253 A1* | 8/2019 | Vij | G06F 18/214 |
| 2019/0281006 A1 | 9/2019 | Dange | |
| 2019/0311036 A1 | 10/2019 | Shanmugam et al. | |
| 2019/0327402 A1 | 10/2019 | Wexler et al. | |
| 2019/0374839 A1 | 12/2019 | Wanke et al. | |
| 2020/0035244 A1 | 1/2020 | Kim | |
| 2020/0151773 A1* | 5/2020 | Peppel | G06Q 30/0271 |
| 2020/0234380 A1 | 7/2020 | Dulori | |
| 2020/0342348 A1 | 10/2020 | Kenny et al. | |
| 2020/0342550 A1 | 10/2020 | Halimsaputera | |
| 2021/0118035 A1* | 4/2021 | Misawa | G06N 5/04 |
| 2021/0174372 A1 | 6/2021 | Jadhav et al. | |
| 2021/0217413 A1 | 7/2021 | Tushinskiy et al. | |
| 2021/0342962 A1 | 11/2021 | Budlong | |
| 2021/0398227 A1 | 12/2021 | Hayward et al. | |
| 2022/0020062 A1* | 1/2022 | Freeman | G06Q 30/0269 |
| 2022/0084146 A1 | 3/2022 | Eisaguirre et al. | |
| 2022/0122570 A1 | 4/2022 | Malachi | |
| 2022/0148034 A1* | 5/2022 | Min | G06Q 30/0256 |
| 2022/0179887 A1 | 6/2022 | Hancock et al. | |
| 2022/0253076 A1 | 8/2022 | Cleland-Huang et al. | |
| 2022/0254338 A1 | 8/2022 | Gruber et al. | |
| 2022/0327289 A1 | 10/2022 | Peng et al. | |
| 2023/0053106 A1 | 2/2023 | Roel-Chapa et al. | |
| 2023/0245651 A1 | 8/2023 | Wang | |
| 2023/0335133 A1 | 10/2023 | Olson et al. | |
| 2023/0351102 A1 | 11/2023 | Tran | |
| 2023/0410799 A1 | 12/2023 | Gyani | |
| 2025/0054027 A1* | 2/2025 | Poreh | G06Q 30/0276 |
| 2025/0173758 A1* | 5/2025 | Azarnoosh | G06F 40/30 |

FOREIGN PATENT DOCUMENTS

| | | | |
|---|---|---|---|
| CN | 111275924 A | 6/2020 | |
| CN | 109121125 B | 3/2021 | |
| CN | 112435136 A | 3/2021 | |
| CN | 112487164 A | 3/2021 | |
| CN | 110459221 B | 2/2022 | |
| CN | 113377850 B | 4/2022 | |
| CN | 111126698 A | 9/2022 | |

(56) References Cited

FOREIGN PATENT DOCUMENTS

| CN | 113437986 B | 1/2023 |
|---|---|---|
| JP | H0886099 A | 4/1996 |
| JP | 2020087061 A | 6/2020 |
| KR | 20030034062 A | 5/2003 |
| KR | 100528182 B1 | 11/2005 |
| KR | 101238810 B1 | 3/2013 |
| KR | 101539076 B1 | 7/2015 |
| KR | 101573327 B1 | 12/2015 |
| NL | 1005702 C2 | 10/1998 |
| TW | 1647631 B | 1/2019 |
| WO | 1999049656 A1 | 9/1999 |
| WO | 2002051114 A1 | 6/2002 |
| WO | 2011149563 A1 | 12/2011 |
| WO | 2014018065 A1 | 1/2014 |
| WO | 2016128862 A1 | 8/2016 |
| WO | 2018034928 A1 | 2/2018 |
| WO | 2020113344 A1 | 6/2020 |
| WO | 2020159255 A1 | 8/2020 |
| WO | 2020262601 A1 | 12/2020 |
| WO | 2022138475 A1 | 6/2022 |
| WO | 2022146684 A1 | 7/2022 |
| WO | 2023239779 A1 | 12/2023 |
| WO | 2023244519 A1 | 12/2023 |

OTHER PUBLICATIONS

"City of Menlo Park", by Hiago, Found Online on [Dec. 15, 2023] Link: https://www.hiago.app/en/organizations/menlo-park.

"Experimenting with public engagement platforms in local government", Published at Arizona state university, by Seongkyung Cho et al., Found Online on [Dec. 15, 2023] Link: https://sci-hub.hkvisa.net/10.1177/1078087419897821.

"Generative Theories of Interaction", Published at HAL open science, by Michel Beaudouin-Lafon et al., Published Online in [Sep. 2021] Link: https://hal.science/hal-03434142/file/GenTheory%20authorversion.pdf.

"Generative artificial intelligence as a new context for management theories: analysis of ChatGPT Analysis of ChatGPT", Published at Central European Management Journal, by Pawel Korzynski et al., Found Online on [Dec. 15, 2023] Link: https://shorturl.at/dwVX7.

"Meet 'Tab'—the Wearable AI Companion by 20yr old Tech Whiz Avi Schiffmann", Published at Metaverse Post, by Victor Dey, Published Online on [Oct. 5, 2023] https://mpost.io/meet-tab-the-wearable-ai-companion-by-20yr-old-tech-whiz-avi-schiffmann/.

"The Humane AI Pin in action", Published at The New York Times, by Erin Griffith et al., Published Online on [Nov. 9, 2023] https://www.nytimes.com/2023/11/09/technology/silicon-valleys-big-bold-sci-fi-bet-on-the-device-that-comes-after-the-smartphone.html.

"Humane launches AI Pin", Published at Humane Inc., Published Online on [Nov. 9, 2023] https://hu.ma.ne/media/humane-launches-ai-pin.

"The Google Home Hub will put Assistant up against Amazon's Echo Show", Published at Vox Media, LLC., by Chaim Gartenberg, Published Online On [Oct. 9, 2023] https://www.theverge.com/circuitbreaker/2018/10/9/17943362/google-home-hub-smart-assistant-screen-price-release-date.

"The history of the Amazon Echo", Published at Humane Inc., by Tyler Lacoma, Published Online on [Sep. 30, 2022] https://www.digitaltrends.com/home/history-of-amazon-echo/?amp.

"Drones navigate unseen environments with liquid neural networks", Published at Massachusetts Institute of Technology, Published Online on [Apr. 19, 2023] https://news.mit.edu/2023/drones-navigate-unseen-environments-liquid-neural-networks-0419.

"Internet-Augmented Dialogue Generation", Published at Association for Computational Linguistics, by Mojtaba Komeili et al., Found Online on [Dec. 22, 2023] https://arxiv.org/pdf/2107.07566.pdf.

"Chatbot as a New Business Communication Tool: The Case of Naver TalkTalk", Published at Business Communication Research and Practice, by Miri Heo et al., Published Online on [Nov. 20, 2017] https://shorturl.at/enEY4.

"Artificial Intelligence in the City: Building Civic Engagement and Public Trust", Published at Centre for Interdisciplinary Research on Montreal, McGill University, by Ana Brandusescuet et al., Published Online on [Jul. 15, 2022] https://shorturl.at/acDTX.

"Empowering Local Communities Using Artificial Intelligence", Published at Cornell University, by Yen-Chia Hsu et al., Published Online on [Apr. 26, 2022] https://arxiv.org/pdf/2110.02007.pdf.

"Sensors and Artificial Intelligence Methods and Algorithms for Human-Computer Intelligent Interaction: A Systematic Mapping Study", Published at AI-Enabled Sensing Technology and Data Analysis Techniques for Intelligent Human-Computer Interaction, by Boštjan Šumak et al., Published Online On [Dec. 21, 2021] https://www.mdpi.com/1424-8220/22/1/20.

"Hands-On Generative AI using real-world applications", Published at Altimetrik, by Agam Dogra, Published Online On [Dec. 11, 2023] https://www.altimetrik.com/hands-on-generative-ai-using-real-world-applications/.

"PiggieBank", Published at Network Limited, Published Online on [Nov. 9, 2023] https://www.f6s.com/company/piggiebank#about.

"The AirForce's Drones Can Now Recognize Faces Uh-Oh", Published at U.S. Air Force's Drones Can Now Recognize Faces, by Sascha Brodsky, Published Online on [Feb. 24, 2023] https://www.popularmechanics.com/military/a43064899/air-force-drones-facial-recognition/.

"OpenPose: Realtime Multi-Person 2D Pose Estimation using Part Affinity Fields", Published at Ieee Transactionson Pattern Analysis and Machine Intelligence, by Zhe Cao et al., Published Online on [May 30, 2019] https://arxiv.org/pdf/1812.08008.pdf.

"What's a convolutional neural network and how is it used for image recognition in search", Published at Algolia, Published Online on [Mar. 1, 2023] https://shorturl.at/beosS.

"How Tesla Uses and Improves Its AI for Autonomous Driving", Published at Enterprise AI, by All Azhar, Published Online on [Jan. 3, 2024] https://www.enterpriseai.news/2023/03/08/how-tesla-uses-and-improves-its-ai-for-autonomous-driving/.

"How do you Converse with an Analytical Chatbot? Revisiting Gricean Maxims for Designing Analytical Conversational Behavior", Published at New Orleans, by Vidya Setlur et al., Published in [2022] https://dl.acm.org/doi/pdf/10.1145/3491102.3501972.

"Natural User Interfaces for Human-Drone Multi-Modal Interaction", Published at Technical University of Madrid, by Ramon A. Suarez Fernandez, Found Online on [Jan. 5, 2024] https://www.researchgate.net/publication/304816895_Natural_user_interfaces_for_human-drone_multi-modal_interaction.

"SmarTy: An Intelligent Voice Response System Model for Indian Local Languages", Published at Madanapalle Institute of Technology & Science, by Komala Anamalamudi et al., Published in [Apr. 2022] https://shorturl.at/hpvZ6.

"Computing Systems for Autonomous Driving: State-of-the-Art and Challenges", Published at Wayne State University, by Liangkai Liu et al., Published Online on [Dec. 7, 2020] https://arxiv.org/pdf/2009.14349.pdf.

"Intelligent Voice Assistant Extended Through Voice Relay System", Published at Defensive Publications Series, by Lawrence Chang et al., Published Online on [Aug. 29, 2018] https://www.tdcommons.org/cgi/viewcontent.cgi?article=2509&context=dpubs_series.

"Integrating Artificial Intelligence and Wearable IoT System in Long-Term Care Environments", Published at Chaoyang University of Technology, by Wei-Hsun Wang et al., Published Online on [Jun. 26, 2023] https://www.mdpi.com/1424-8220/23/13/5913.

"Generative AI", Published at Bus Inf Syst Eng, by S. Feuerriegel et al., Published Online on [Sep. 12, 2023] https://www.researchgate.net/profile/Patrick-Zschech/publication/370653602_Generative_AI/links/651f054c3ab6cb4ec6bdf41b/Generative-AI.pdf?tp=eyJjb250Z Xh0Ijp7ImZpcnNOUGFnZSI6InB1YmxpY2F0aW9uliwicGFnZSI 6InB1YmxpY2F0aW9uln19.

"Integrating body-worn cameras, drones, and AI: A framework for enhancing police readiness and response", Published at a Journal of Policy and Practice, by Amanda Davies et al., Published Online on [Dec. 13, 2023] https://www.researchgate.net/publication/376484601_Integrating_body-worn_cameras_drones_and_AI_A_framework_for_enhancing_police_readiness_and_response.

(56) References Cited

OTHER PUBLICATIONS

"Interactive Voice Response System With Speech Recognition", Published at Tribhuvan University Institute of Engineering Pulchowk Campus, by Prabin Bhandari et al., Published Online in [Aug. 2017] https://shorturl.at/hDQ15.

"Talk of the Town: Discovering Open Public Data via Voice Assistants", Published at University of California, by Sara Lafia et al., Found Online on [Jan. 10, 2024] https://drops.dagstuhl.de/storage/00lipics/lipics-vol142-cosit2019/LIPIcs.COSIT.2019.10/LIPIcs.COSIT.2019.10.pdf.

"The Implications of Providing Voice-Based Chatbots in Public Service for Digital Inclusion and Public Communication", Published at The Journal of Multicultural Society, by Jinsoon Song, Published Online in [2022] http://omnesjournal.org/XML/33977/33977.pdf.

"A Method for Increasing User Engagement with Voice Assistant System", Published at Samsung Electronics, by Daehee Park et al., Published Online in [Jul. 2020] https://shorturl.at/dIDK8.

"The Potential of Artificial Intelligence in Government Citizen Engagement", Published at Research Brief, by Genesys, Found Online on [Jan. 10, 2024] https://shorturl.at/mAT49.

"10 Ways to Use Artificial Intelligence (AI) in Community Engagement", Published at Social PinPoint, by Caitlin Ryan, Published Online on [Aug. 30, 2023] https://www.socialpinpoint.com/ways-to-use-artificial-intelligence-ai-in-community-engagement/.

"Sustainable Subdivision Planning and Design: Analysis, Literature Review and Annotated Bibliography", Published at Institute of Urban Studies, University of Winnipeg, by IDavid R. Van Vliet, Found Online on [Jan. 12, 2024] https://core.ac.uk/download/pdf/144470264.pdf.

"Information and Communication Technologies for Public Use and Interactive-Multimedia City Kiosks", Published at izmir Institute of Technology, by Özlem Taskin , Published in [Apr. 2004] https://core.ac.uk/download/pdf/324144408.pdf.

"Interactive Digital Kiosks", Published at City Council Economic Development Committee, by Mayor's Office of Economic Development, Published Online on [Mar. 22, 2021] https://www.houstontx.gov/council/committees/econdev/20210322/digital-kiosks.pdf.

"Building a Smart Interactive Kiosk for Tourist Assistance", Published at Society for Science and Education, by Hanane Amessafi et al., Published Online on [Aug. 15, 2017] https://www.researchgate.net/publication/320000798_Building_a_Smart_Interactive_Kiosk_for_Tourist_Assistance.

"Revolutionizing Customer Interactions: Insights and Challenges in Deploying ChatGPT and Generative Chatbots for FAQs", Published at Arxiv, by Feriel Khennouche et al., Published Online on [Nov. 16, 2023] https://arxiv.org/pdf/2311.09976.pdf.

"Generative AI in Computing Education:Perspectives of Students and Instructors", Published at Computer & Information Sciences Temple University, by Cynthia Zastudil et al., Published Online on [Aug. 8, 2023] https://arxiv.org/pdf/2308.04309.pdf.

"Imagining a New Era of Customer Experience With Generative AI", Published at Capgemini, by Alex Smith Bingham et al., Found Online on [Jan. 11, 2024] https://prod.ucwe.capgemini.com/wp-content/uploads/2023/07/2023-07-27_Gen-AI-for-CX-POV_Opt1_v3_MD-1.pdf.

"Generative AI: Unleashing Innovation and Exploringits Impact", Published at White Paper Rackspace Technology, by Microsoft Azure, Found Online on [Jan. 11, 2024] https://www.rackspace.com/sites/default/files/white-papers/Rackspace-White-Paper-Generative-AI-AZU-FAIR-TSK-9353.pdf.

"How gen AI is reimagining and remaking the modern contact center", Published at Google Cloud, by Thomas Kurian, Published Online in [Aug. 2023] https://www.cognizant.com/en_us/about/documents/how-gen-ai-is-reimagining-and-remaking-the-modern-contact-center.pdf.

"AI in Customer Experience", Published at Insider Intelligence, by Jessica Lis, Published in [Mar. 2022] https://marketing.acxiom.com/rs/982-LRE-196/images/eMarketer_AI_in_Customer_Experience_Report.pdf.

"Customer Predictive Analytics Using Artificial Intelligence", Published at World Scientific, by Siti Zulaikha et al., Published Online on [Aug. 6, 2020] https://repository.unair.ac.id/113843/4/Masmira_Artikel104_Customer%20Predictive.pdf.

"The Role of Artificial Intelligence on Enhancing Customer Experience", Published at International Review of Management and Marketing, by Mohannad Abu Dagar et al., Published Online in [Jul. 2019] https://www.econjournals.com/index.php/irmm/article/view/8166/pdf.

"Atherton" by Raj Abhyanker, Published Online in [2022] https://www.atherton.com/mapview.

"Split your lot using SB 9" by Homestead, Published Online in [2022] https://www.myhomestead.com/learn.

"Symbium—Property and Permit Information Portal", by Symbium, Found Online on [Jan. 11, 2024] https://symbium.com/search/.

"Zillow for Advertisers", by Zillow, Published Online in [Mar. 2007] https://www.zillow.com/static/pdf/Zillow_Media_Kit_March_2007.pdf.

"Proposed Algorithm of Land Parcel Subdivision", Published at Journal of Surveying Engineering, by Maan Habib, Published Online in [Aug. 2020]. https://www.researchgate.net/publication/341113196_Proposed_Algorithm_of_Land_Parcel_Subdivision.

"Procedural Generation of Parcels in Urban Modeling", Published at Eurographics, by Carlos A. Vanegas et al., Published Online in [2012] https://www.cs.purdue.edu/cgvlab/papers/aliaga/eg2012.pdf.

"SB9: A Comprehensive Guide to Lot-Splits in California", by Maxable, Found Online on [Jan. 11, 2024] https://maxablespace.com/sb9-a-comprehensive-guide-to-lot-splits-in-california/.

* cited by examiner

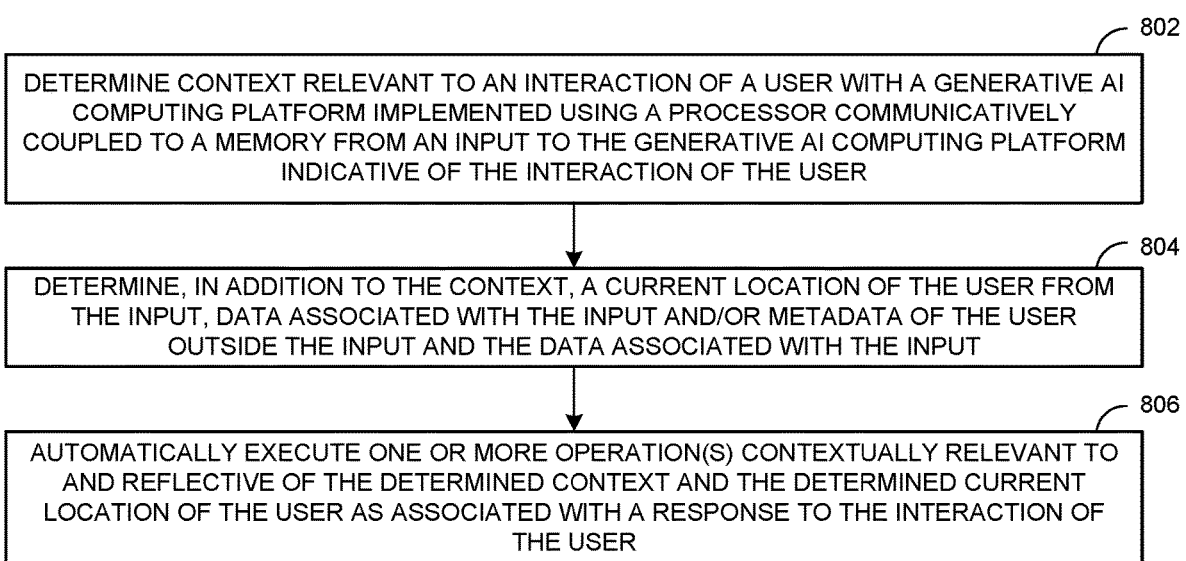

802

DETERMINE CONTEXT RELEVANT TO AN INTERACTION OF A USER WITH A GENERATIVE AI COMPUTING PLATFORM IMPLEMENTED USING A PROCESSOR COMMUNICATIVELY COUPLED TO A MEMORY FROM AN INPUT TO THE GENERATIVE AI COMPUTING PLATFORM INDICATIVE OF THE INTERACTION OF THE USER

804

DETERMINE, IN ADDITION TO THE CONTEXT, A CURRENT LOCATION OF THE USER FROM THE INPUT, DATA ASSOCIATED WITH THE INPUT AND/OR METADATA OF THE USER OUTSIDE THE INPUT AND THE DATA ASSOCIATED WITH THE INPUT

806

AUTOMATICALLY EXECUTE ONE OR MORE OPERATION(S) CONTEXTUALLY RELEVANT TO AND REFLECTIVE OF THE DETERMINED CONTEXT AND THE DETERMINED CURRENT LOCATION OF THE USER AS ASSOCIATED WITH A RESPONSE TO THE INTERACTION OF THE USER

FIG. 8

METHOD, DEVICE AND SYSTEM OF CONTEXTUAL AND USER LOCATION BASED OPERATIONAL EXECUTION VIA A GENERATIVE ARTIFICIAL INTELLIGENCE (AI) COMPUTING PLATFORM IN RESPONSE TO USER INTERACTION THEREWITH

CLAIM OF PRIORITY

This Application is a conversion Application of, claims priority to, and incorporates by reference herein the entirety of the disclosures of:

U.S. Provisional Patent Application No. 63/608,394 titled INTEGRATED AI-POWERED PUBLIC COMMENT ANALYSIS AND MANAGEMENT SYSTEM AND METHOD FOR PUBLIC ENGAGEMENT filed on Dec. 11, 2023, U.S. Provisional Patent Application No. 63/607,554 titled SMART INTERACTIVE VOICE-RESPONSIVE DEVICE AND SYSTEM OF ENHANCED CONSTITUENT COMMENT INTERPRETATION AND ANALYSIS IN PUBLIC MEETINGS filed on Dec. 7, 2023, U.S. Provisional Patent Application No. 63/607,693 titled PORTABLE INTERACTIVE COMMUNITY ENGAGEMENT AND FEEDBACK MICROPHONE SYSTEM filed on Dec. 8, 2023, and U.S. Provisional Patent Application No. 63/607,699 titled SMART INTERACTIVE VOICE-RESPONSIVE KIOSK AND SYSTEM OF ENHANCED CONSTITUENT COMMENT INTERPRETATION AND ANALYSIS FROM PUBLIC SPACES filed on Dec. 8, 2023.

FIELD OF TECHNOLOGY

This disclosure relates generally to computing platforms and, more particularly, to a method, a device and/or a system of contextual and user location based operational execution via a generative Artificial Intelligence (AI) computing platform in response to user interaction therewith.

BACKGROUND

In the context of the challenges faced in hyper-tailoring content and engaging with local communities, a significant issue is that much of the pertinent data is confined within the walls of local government offices. Municipalities and county offices are treasure troves of valuable information that could be utilized for more effective community engagement and tailored services. They hold Geographic Information System (GIS) records, which provide detailed geographical data; minutes of city council meetings, offering insights into local legislative processes; public comments that reflect community concerns and interests; and recordings of meetings, which can give context and depth to understanding local issues. Unfortunately, this data is often "locked up" in these offices, not readily accessible to the public Internet or to systems (e.g., the Nextdoor® neighborhood social network or Google® search engine) designed to leverage such information for the benefit of the community. This lack of accessibility and integration into broader digital platforms hampers the ability of neighborhood networks and search engines to fully understand and respond to the nuanced needs of local communities. As a result, there is a missed opportunity for deeper, more relevant engagement with residents, as this rich, localized data remains underutilized.

SUMMARY

Disclosed are a method, a device and/or a system of contextual and user location based operational execution via a generative Artificial Intelligence (AI) computing platform in response to user interaction therewith.

In one aspect, a method of a generative AI computing platform implemented using a processor communicatively coupled to a memory is disclosed. The method includes determining context relevant to an interaction of a user with the generative AI computing platform from an input to the generative AI computing platform indicative of the interaction of the user. The method also includes determining, in addition to the context, a current location of the user from the input, data associated with the input and/or metadata of the user outside the input and the data associated with the input. Further, the method includes automatically executing one or more operation(s) contextually relevant to and reflective of the determined context and the determined current location of the user as associated with a response to the interaction of the user.

In another aspect, a data processing device includes a memory and a processor communicatively coupled to the memory. The memory includes instructions associated with a generative AI computing platform stored therein. The processor executes the instructions associated with the generative AI computing platform to determine context relevant to an interaction of a user with the generative AI computing platform from an input to the generative AI computing platform indicative of the interaction of the user. The processor also executes the instructions associated with the generative AI computing platform to determine, in addition to the context, a current location of the user from the input, data associated with the input and/or metadata of the user outside the input and the data associated with the input. Further, the processor executes the instructions associated with the generative AI computing platform to automatically execute one or more operation(s) contextually relevant to and reflective of the determined context and the determined current location of the user as associated with a response to the interaction of the user.

In yet another aspect, a system includes one or more server(s) executing a generative AI computing platform thereon, and a data processing device communicatively coupled to the one or more server(s) through a computer network. As associated with a response to an input to the generative AI computing platform indicative of an interaction of a user of the data processing device therewith, the generative AI computing platform determines context relevant to the interaction of the user with the generative AI computing platform from the input. Also, the generative AI computing platform determines, in addition to the context, a current location of the user from the input, data associated with the input and/or metadata of the user outside the input and the data associated with the input. Further, the generative AI computing platform automatically executes one or more operation(s) contextually relevant to and reflective of the determined context and the determined current location of the user.

The methods and systems disclosed herein may be implemented in any means for achieving various aspects, and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 8 is a process flow diagram detailing the operations involved in contextual and user location based operational execution via a generative AI computing platform in response to user interaction therewith, according to one or more embodiments.

Other features of the present embodiments will be apparent from the accompanying drawings and from the detailed description that follows.

DETAILED DESCRIPTION

Example embodiments, as described below, may be used to provide a method, a device and/or a system of contextual and user location based operational execution via a generative Artificial Intelligence (AI) computing platform in response to user interaction therewith. Although the present embodiments have been described with reference to specific example embodiments, it will be evident that various modifications and changes may be made to these embodiments without departing from the broader spirit and scope of the various embodiments.

Figure 1:
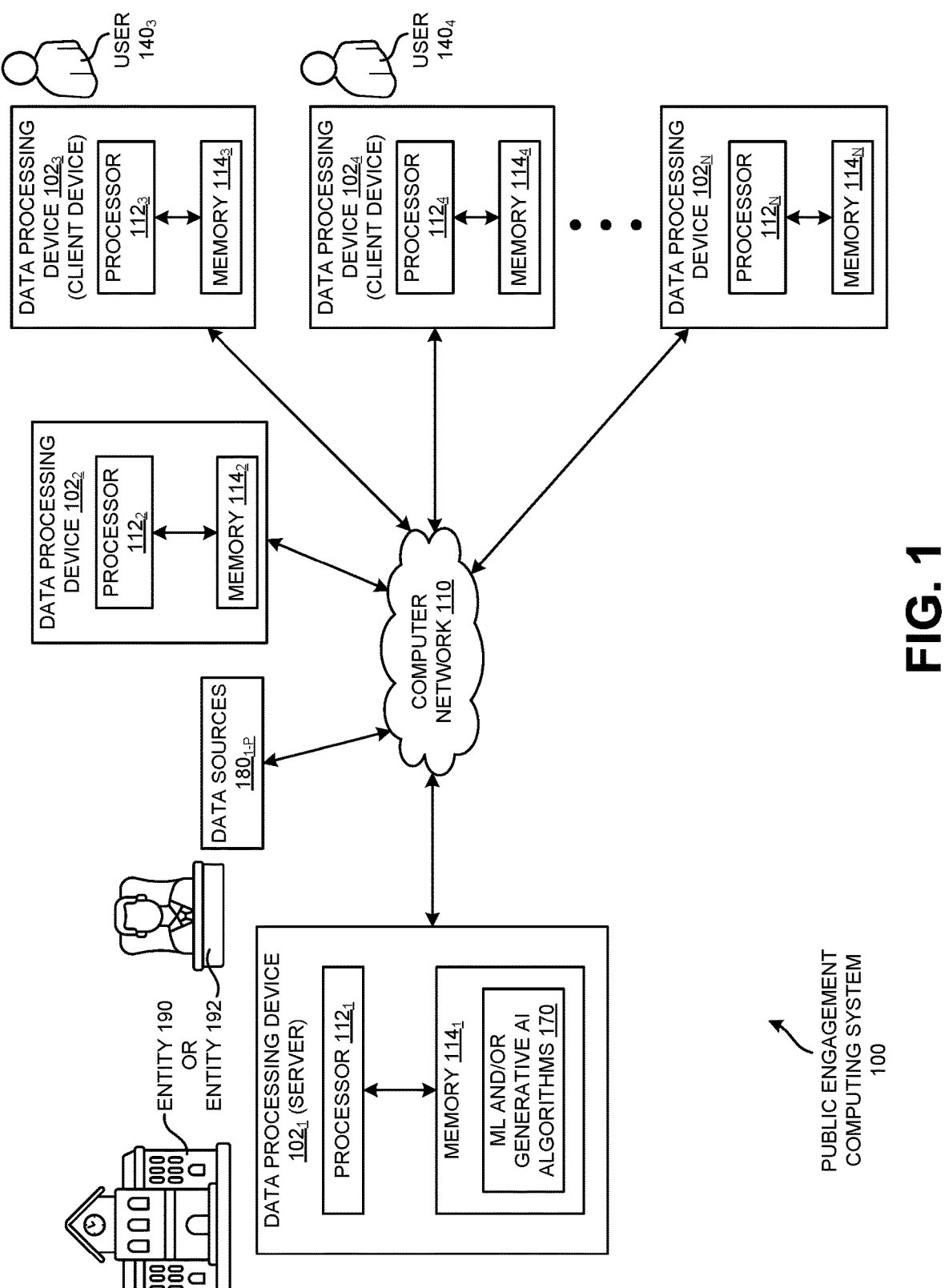
FIG. 1 is a schematic view of a public engagement computing system, according to one or more embodiments.

FIG. 1 shows a public engagement computing system 100, according to one or more embodiments. In one or more embodiments, public engagement computing system 100 may include a number of data processing devices $102_{1-N}$ Communicatively coupled to one another through a computer network 110 (e.g., a public and/or a private computer network, a Wide Area Network (WAN), a Local Area Network (LAN), a short-range network, a mobile network). In one or more embodiments, public engagement computing system 100 may be associated with local governments attempting to increase engagement with people and/or increase engagement between people and local businesses. For example, public engagement computing system 100 may be associated with a city government attempting to engage with residents through events such as meetings and/or a local authority/entity and/or a set of authorities/ entities providing for Artificial Intelligence (AI) based association with products and/or services within the locality and/or associated therewith. Other examples of functionalities and/or capabilities of public engagement computing system 100 may be apparent from the detailed discussions below.

In one or more embodiments, data processing devices $102_{1-N}$ may include one or more server(s) (e.g., a distributed network of servers, a cluster of servers, one or more standalone servers) and/or one or more client devices such as laptops, desktops, mobile devices, thin client devices and smart devices. Other forms of data processing devices $102_{1-N}$ are within the scope of the exemplary embodiments discussed herein. In FIG. 1, data processing device $102_1$ is shown as a server for example purposes and may execute Machine Learning (ML) and/or generative Artificial Intelligence (AI) algorithms 170 thereon. For the aforementioned purpose, in one or more embodiments, data processing device $102_1$ may include a processor $112_1$ communicatively coupled to a memory $114_1$ (e.g., a volatile and/or a nonvolatile memory). While FIG. 1 shows ML and/or generative AI algorithms 170 as executing solely on data processing device $102_1$, it should be noted that execution thereof may be distributed across more than one data processing device $102_{1-N}$ of public engagement computing system 100.

FIG. 1 shows each data processing device $102_{1-N}$ as including a processor $112_1$ communicatively coupled to a memory $114_1$, according to one or more embodiments. As shown in FIG. 1, in one or more embodiments, ML and/or generative AI algorithms 170 implemented therein may execute various functionalities discussed herein. ML and/or generative AI algorithms 170, in one or more embodiments, may be implemented by an entity 190 associated with data processing device $102_1$ or another entity 192 (e.g., an advertisement computing platform, a business aggregator) whose capabilities are subscribed to through data processing device $102_1$. FIG. 1 shows data processing devices $102_{3-4}$ as being client devices associated with corresponding users (e.g., user $140_{3-4}$) for example purposes. All reasonable variations are within the scope of the exemplary embodiments discussed herein.

Figure 2:
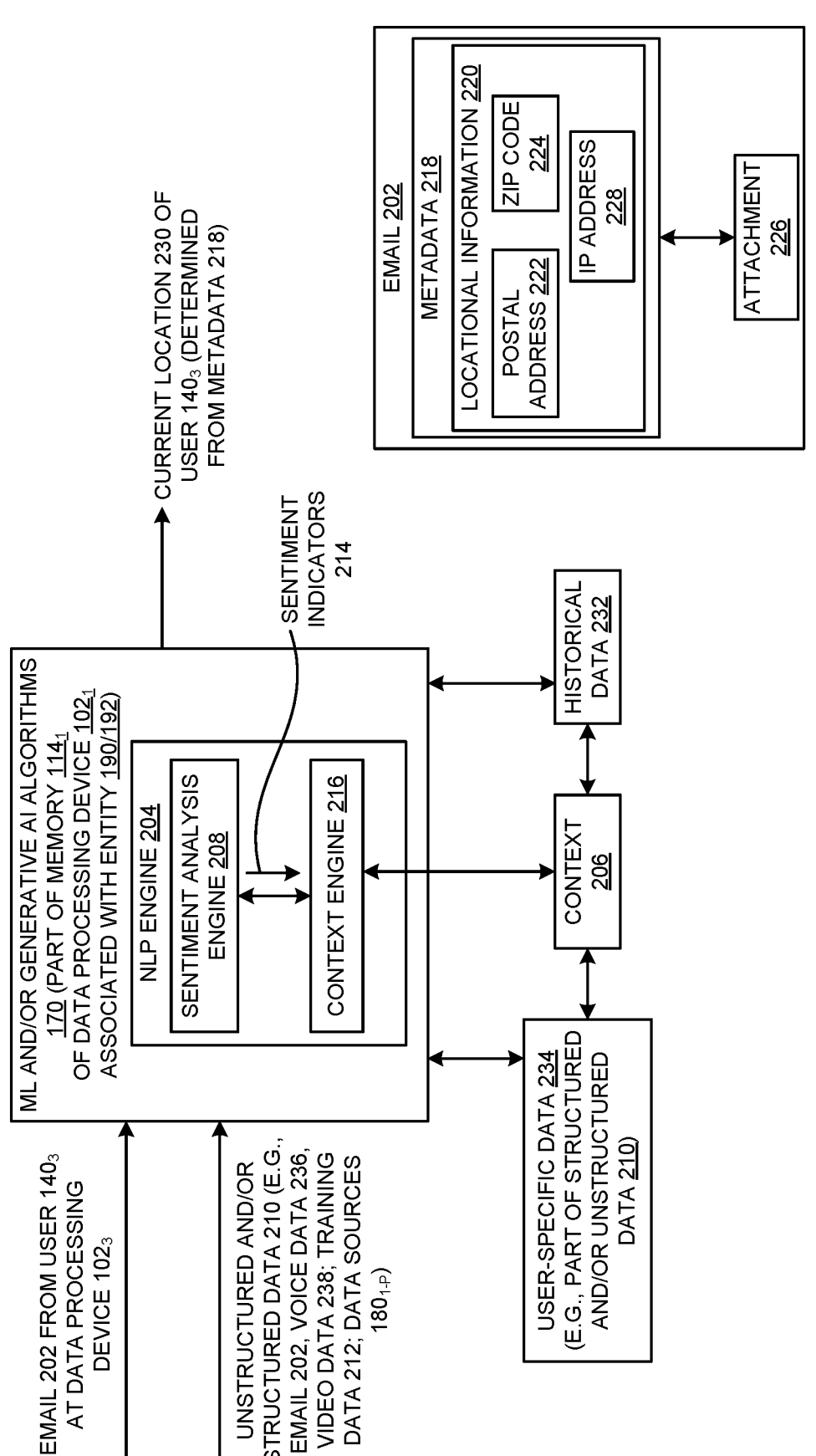
FIG. 2 is a schematic view of Machine Learning (ML) and/or Artificial Intelligence (AI) algorithms implemented on a data processing device of the public engagement computing system of FIG. 1, according to one or more embodiments.

FIG. 2 shows ML and/or generative AI algorithms 170, according to one or more embodiments. In one example scenario, a user $140_3$ may transmit an electronic mail (email; e.g., email 202) to a representative (e.g., a clerk, a member) of entity 190 (e.g., a city council). In one or more embodiments, email 202 may be received as an input to ML and/or generative AI algorithms 170 that, in turn, may include Natural Language Processing (NLP) algorithms implemented therein (e.g., via NLP engine 204) to analyze a language of email 202 to extract context 206 therefrom. In some embodiments, context 206 extracted may be based on, among other things, a sentiment analysis (e.g., performed through sentiment analysis engine 208 that is part of NLP engine 204). For example, the sentiment analysis may involve simple rule-based analyses, complex sets of ML-based analyses (e.g., based on training ML and/or generative AI algorithms 170 with structured and/or unstructured data 210 (e.g., including training data 212) to recognize patterns and/or specific elements based on tagging and/or other forms of classifiers) and/or mixed analyses that extract and/or score relevant elements (e.g., nouns) within email 202. Referring back to FIG. 1, in one or more embodiments, public engagement computing system 100 may have a number of data sources 180$_{1-P}$ therein associated with data processing devices 102$_{1-N}$ and/or communicatively coupled thereto via computer network 110. In some embodiments, a data processing device 102$_{1-N}$ itself may be a data source 180$_{1-P}$. Examples of data sources 180$_{1-P}$ may include but are not limited to databases, data processing devices including but not limited to legacy computing devices, data archives and servers.

In one or more embodiments, structured and/or unstructured data 210 including training data 212 may be part of one or more data sources 180$_{1-P}$ of public engagement computing system 100. "Structured data," as discussed herein, may refer to data in standardized and/or predefined formats (e.g. tabular data). "Unstructured data," as discussed herein, may refer to unclassified and/or unsorted information in random and/or non-standard formats and may exist in the form of multimedia (e.g., unsorted text data, video data, image data), emails including email 202 (e.g., part of structured and/or unstructured data 210), forum posts, social media posts, locational information such as Global Positioning System (GPS) data, sensor data and/or Internet of Things (IoT) data. Both "structured data" and "unstructured data" may be "human" and/or "machine" generated.

For example, email 202 may include text content such as "While it is understood that tax collections for the previous year were unprecedentedly low, the City Council's budget cuts for the local libraries for 2023-2024 is not wholly warranted" in combination with other contents, extraction of context 206 from email 202 may involve interpretation of one or more reasons for user 140$_3$ to "feel" (e.g., the sentiment analysis may yield the "feelings"/sentiments of user 140$_3$) that the budgets cuts are not wholly warranted. Complex sentiment analysis (e.g., based on scores, proximity of sentiment indicators) through sentiment analysis engine 208 may yield sentiment indicators that serve as insights derived even from seemingly ambiguous sentences. FIG. 2 shows sentiment indicators 214 as an output (e.g., fed as an input to a context engine 216 of NLP engine 204 to extract context 206 discussed above) of sentiment analysis engine 208, according to one or more embodiments.

In one or more embodiments, email 202 may also have metadata 218 embedded therein and/or associated therewith. Examples of metadata 218 may include but are not limited to locational information (e.g., locational information 220) such as a postal/residential address (e.g., postal address 222) and a zip code (e.g., zip code 224). In some embodiments, metadata 218 (e.g., including at least some locational information 220) may be available in an attachment (e.g., attachment 226 such as a document, an interpretable image file and/or a video file) to email 202. Further, in one or more embodiments, locational information 220 may also include an Internet Protocol (IP) address 228 extracted/extractable from email 202 (e.g., extracted from a header of email 202). In scenarios where email 202 is sent from a location associated with IP address 228 that is different from postal address 222/zip code 224 due to one or more possible reasons (e.g., user 140$_3$ sending email 202 while in a location away from postal address 222/zip code 224, IP address 228 associated with another location because of a specific configuration of email system through which email 202 is transmitted), postal address 222/zip code 224 may be utilized as metadata 218 for the purposes to be discussed below.

If email 202 continues to be sent from the location associated with IP address 228 based on the determination of a frequency of emails and/or a time spacing between these emails from user 140$_3$ to entity 190 in general and said location is different from postal address 222/zip code 224, ML and/or generative AI algorithms 170 may interpret the location as a current location of user 140$_3$. In case of the email system through which email 202 is sent not including an actual IP address of user 140$_3$ reflecting an accurate current location thereof, other ways of determining (e.g., via reverse email lookup services, user time zone) the current location of user 140$_3$ may be employed. FIG. 2 shows a current location 230 of user 140$_3$ determined from metadata 218 (e.g., postal address 222, zip code 224 and/or IP address 228), according to one or more embodiments. Unless otherwise stated, most data elements discussed herein may be input to and/or generated based on execution of ML and/or generative AI algorithms 170 through processor 112$_1$. And, unless otherwise stated, all operations discussed herein and/or functionalities enabled therethrough may be based on execution of ML and/or generative AI algorithms 170 through processor 112$_1$.

Figure 3:
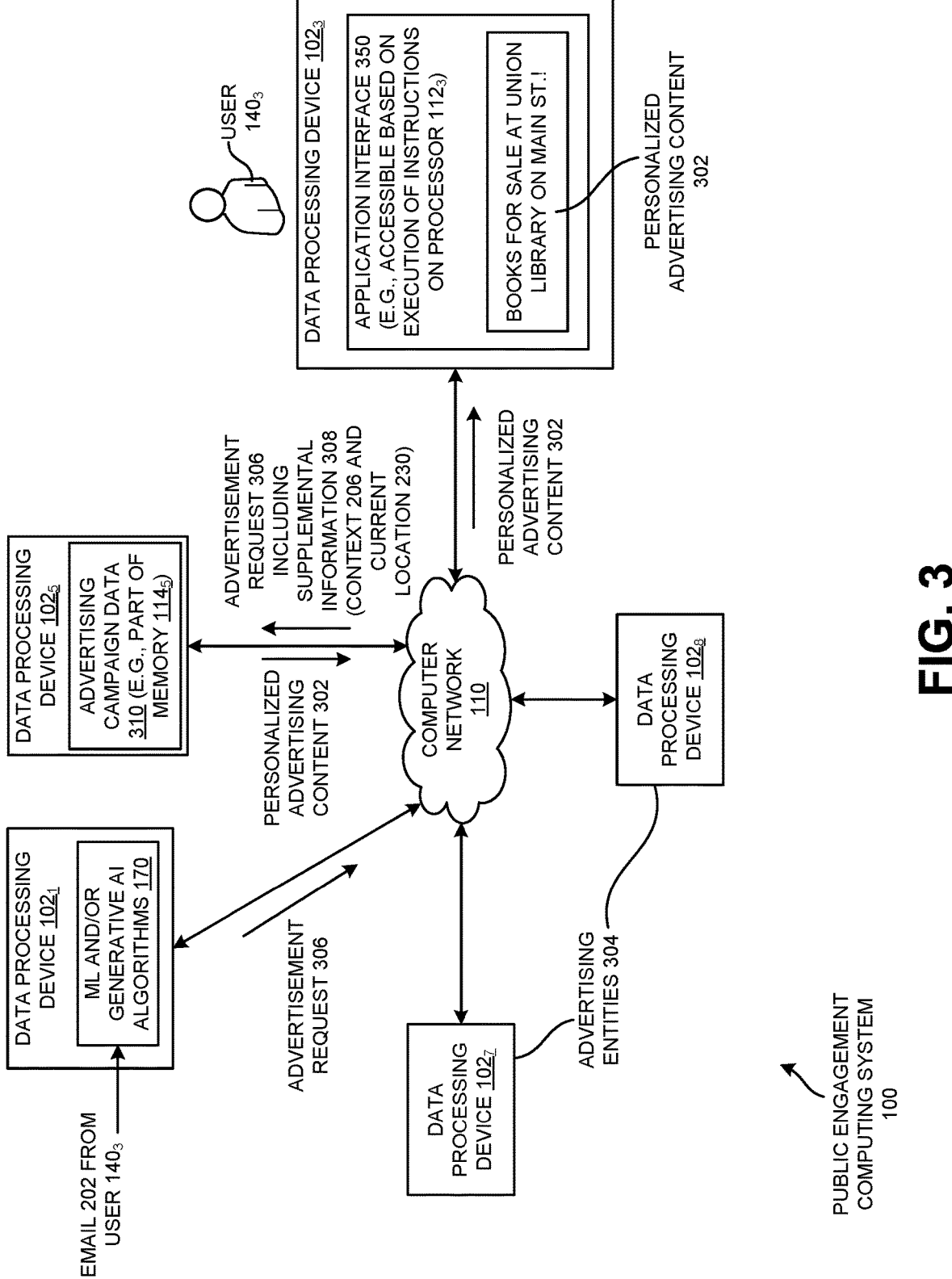
FIG. 3 is a schematic and an illustrative view of a scenario of generation of personalized advertising content and rendering thereof on a data processing device associated with a user of the public engagement computing system of FIG. 1, according to one or more embodiments.

In one or more embodiments, in accordance with analysis/extraction of context 206 and metadata 218, for example, postal address 222, zip code 224 and/or IP address 228, and the determination of current location 230 from metadata 218, public engagement computing system 100 may create and deliver highly personalized advertising content to user 140$_3$ (and other users) therewithin. FIG. 3 shows a scenario of generation of personalized advertising content 302 and rendering thereof on data processing device 102$_3$ associated with user 140$_3$, according to one or more embodiments. Here, an example data processing device 102$_5$ (e.g., an advertisement server; could be a distributed and/or a cluster of data processing devices, a standalone data processing device) may broker the generation of personalized advertising content 302 between data processing device 102$_1$ and a set of advertising entities 304 (e.g., represented by data processing devices 102$_{7-8}$; advertising entities 304 may be product and/or services companies) based on the analysis/extraction of context 206 and metadata 218 from email 202 and the determination of current location 230 from metadata 218 discussed above.

In some embodiments, data processing device 102$_5$ and/or one or more of data processing devices 102$_{7-8}$ may be the same as data processing device 102$_1$. In one or more embodiments, in accordance with the analysis/extraction of context 206 and metadata 218 from email 202 and the determination of current location 230 discussed above, ML and/or generative AI algorithms 170 may initiate an advertisement request 306 to data processing device 102$_5$ (e.g., an advertisement server; a distributed network of data processing devices and/or a cluster of data processing devices or a standalone server). In one or more embodiments, advertisement request 306 may carry supplemental information 308 including context 206 and current location 230. In one or more embodiments, as the aforementioned context 206 may be in the form of string data, processing of advertisement request 306 may cause searching of advertising campaign data 310 (e.g., data related to advertising campaigns associated with advertising entities 304 and other entities associated with different data processing devices 102$_{1-N}$) within (or associated with) data processing device $102_5$ for a match based on context 206 and current location 230.

In one or more embodiments, in accordance with determination of the match between context 206 and current location 230 across advertising campaigns 310 associated with an advertising entity 304 (e.g., represented by data processing device $102_7$), personalized advertising content 302 may be generated from advertising campaigns 310. In an example implementation, personalized advertising content 302 may be rendered on an application interface 350 (e.g., a web browser during a browsing session, an interface associated with ML and/or generative AI algorithms 170 through which user $140_3$ at data processing device $102_3$ interacts with ML and/or generative AI algorithm 170) viewable via data processing device $102_3$. Here, a Javascript tag may be transmitted to application interface 350 and, based on the pointing of the Javascript file to personalized advertising content 302 on, say, data processing device $102_5$, personalized advertising content 302 may be rendered on application interface 350 accessed via data processing device $102_3$.

In an example scenario associated with FIG. 3, user $140_3$ may access a website of a city council. The website may provide an interface (e.g., an interface accessible via application interface 350) for user $140_3$ to email a representative of the city council (example entity 190). Once user $140_3$ sends email 202 via the interface accessible through data processing device $102_3$ thereof, context 206 and current location 230 may be extracted and analyzed based on execution of ML and/or generative AI algorithms 170 at data processing device $102_1$ and personalized advertising content 302 rendered on application interface 350 and/or the interface accessible by data processing device $102_3$ based on the matching process discussed above. As discussed above, in one scenario, user $140_3$ may have written email 202 to complain about budget cuts associated with local libraries. In accordance with the determination of context 206 and current location 230 of user $140_3$, personalized advertising content 302 may relate to a sale of books by a local library and/or a private business in locational proximity to current location 230 of user $140_3$.

In another scenario, user $140_3$ may have written email 202 about neighborhood disturbances caused by pets, where, based on the determination of context 206 and current location 230, personalized advertising content 302 may relate to a local business proximate to current location 230 selling noise-cancelling headphones and/or media (e.g., books) related to pet owner etiquette. Thus, exemplary embodiments may provide for sophisticated advertisement targeting based on user interaction with data processing device $102_1$ representing, for example, entity 190. It should be noted that, in one or more embodiments, context 206 itself may be refined based on access of historical email data (e.g., part of historical data 232 that includes past emails from user $140_3$) that provide for better insights about the evolution of sentiments of user $140_3$ with regard to issues associated with email 202. In some embodiments, context 206 may be refined based on data that is part of structured and/or unstructured data 210/training data 212 and/or other user-specific data 234 (e.g., data specific to user $140_3$; metadata 218, in some implementations, may also include data from user-specific data 234; user-specific data 234 may be part of structured and/or unstructured data 210). In some embodiments, postal data 222 and/or zip code 224 of user $140_3$ may be available as part of user-specific data 234; email 202 may or may not be required to extract the aforementioned postal data 222 and/or zip code 224. Based on the access of user-specific data 234 through one or more data sources $180_{1-P}$ discussed above, data processing device $102_1$ may extract the aforementioned postal data 222 and/or zip code 224 based on execution of ML and/or generative AI algorithms 170 thereon.

Figure 4:
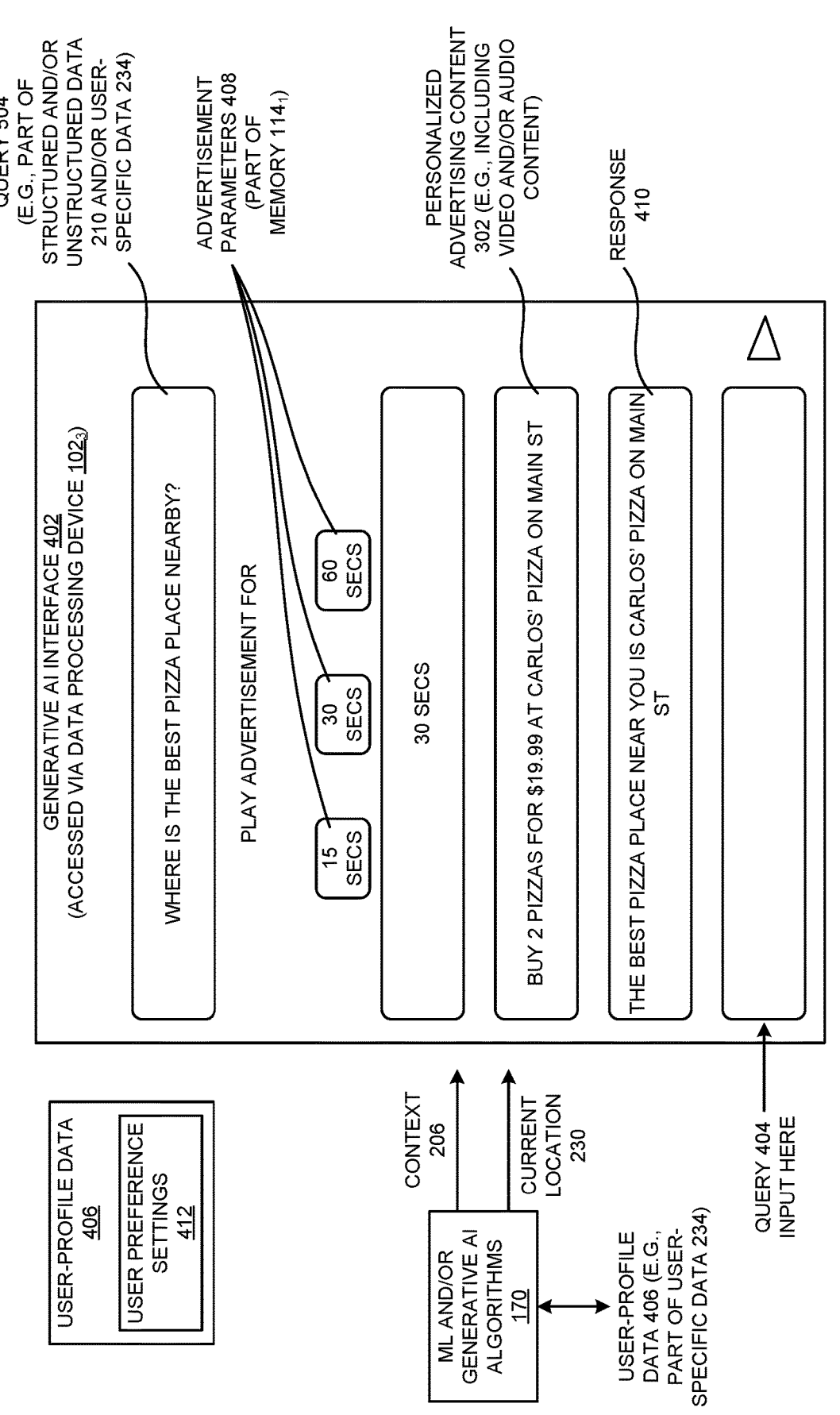
FIG. 4 is a schematic and an illustrative view of an interaction of the user of the data processing device of FIG. 1 and FIG. 3 with a generative AI interface provided by the public engagement computing system of FIG. 1, according to one or more embodiments.

It should be noted that inputs from user $140_3$ may not be limited to email 202. In one or more embodiments, user $140_3$ may engage with a generative AI interface provided via application interface 350 associated with entity 190 related to data processing device $102_1$. In some implementations, application interface 350 itself may be the generative AI interface. FIG. 4 shows interaction of user $140_3$ with a generative AI interface 402 (e.g., accessed via application interface 350) provided by entity 190 based on execution of ML and/or generative AI algorithms 170 on data processing device $102_1$, according to one or more embodiments. In accordance therewith, in one or more embodiments, user $140_3$ may input a question and/or a prompt into a designated field within generative AI interface 402. FIG. 4 shows the question and/or the prompt as a query 404. In one or more embodiments, query 404 may be relevant to information seeking, advice/recommendation seeking, content generation including creative content generation and/or specific inquiries. The relevance of query 404 to other contexts is within the scope of the exemplary embodiments discussed herein. In one or more embodiments and/or one or more embodiments discussed above, query 404 may be part of structured and/or unstructured data 210 discussed above and/or user-specific data 234.

In one or more embodiments, query 404 may be analyzed in a way similar to the analysis of email 202 discussed above and context 206 and current location 230 of user $140_3$ extracted (e.g., from query 404, from external metadata 218 and so on). Here, in one or more embodiments, user $140_3$ may be profiled through ML and/or generative AI algorithms 170 executing on data processing device $102_1$ that, as part of processing query 404, may extract postal address 222 and/or IP address 228 from metadata 218 (e.g., including user-profile data 406 that may be part of user-specific data 234 discussed above). In response to context 206 and current location 230 determined based on one or more processes discussed above (other processes are within the scope of the exemplary embodiments discussed herein), a matching process analogous to the discussion above may yield personalized advertising content 302. In one or more embodiments, personalized advertising content 302 may be rendered within generative AI interface 402 and/or within application interface 350.

In some implementations, user $140_3$ may be presented with personalized advertising content 302 (e.g., within generative AI interface 402) for a customizable duration (e.g., 15, 30 or 60 seconds). In one or more embodiments, the duration may be selected by user $140_3$ as part of advertisement parameters 408 presented via generative AI interface 402. Advertisement parameters 408 are also shown as stored as part of memory $114_1$ and associated with ML and/or generative AI algorithms 170. In some implements, a length of personalized advertising content 302 may be automatically determined based on complexity of query 404 to and/or a response 410 from generative AI interface 402 to query 404, a historical tolerance (e.g., data related to the historical tolerance may be part of user-profile data 234) of user $140_3$ for the length of advertisements analogous to personalized advertising content 302 and/or user preference settings 412 stored as part of user-profile data 406. In one or more embodiments, personalized advertising content 302 may be rendered within generative AI interface 402 and/or application interface 350 during generation of response 410, prior thereto or after generation of response 410. In some case, the rendering of personalized advertising content 302 prior to generation of response 410 (e.g., again, based on analysis/extraction of context 206 and, additionally or optionally, current location 230) may provide for a seamless experience to user 140₃ whose impatience related issues are mitigated thereby.

Figure 5:
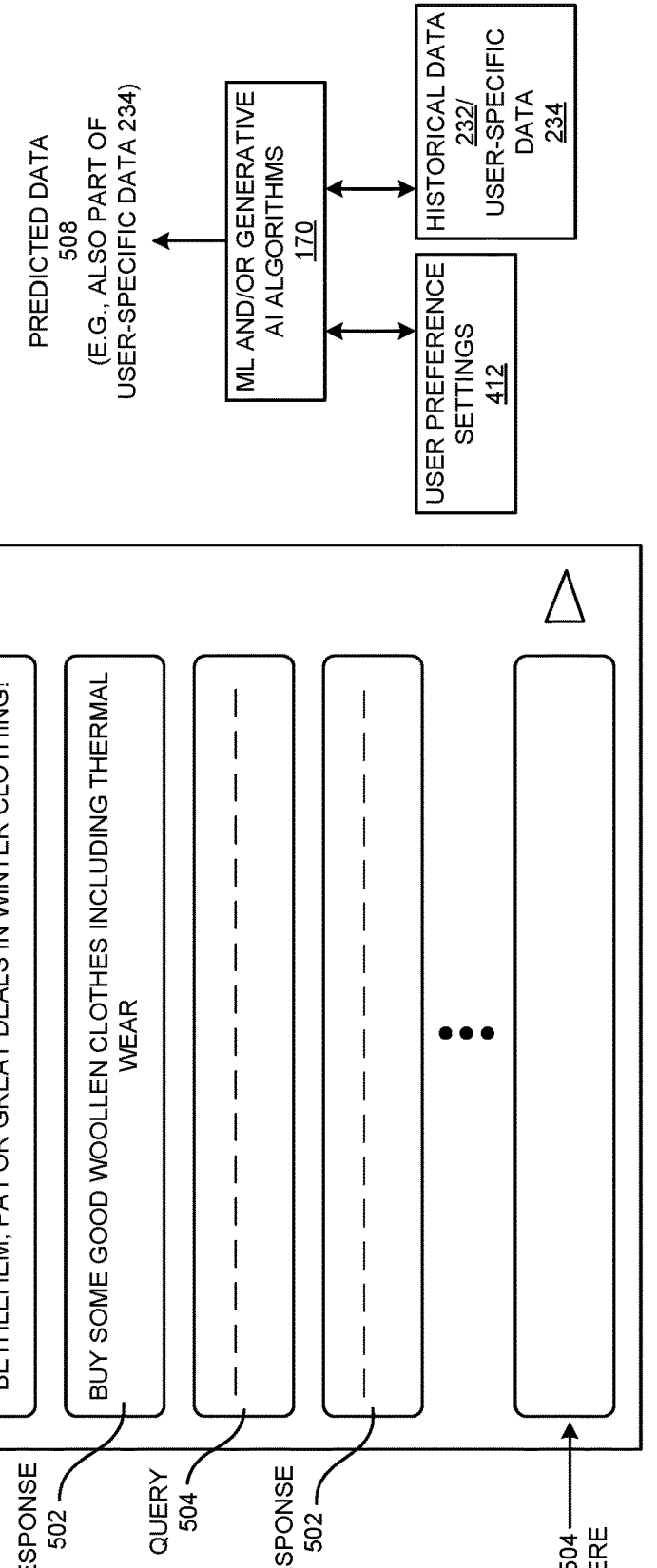
FIG. 5 is a schematic and an illustrative view of a more interactive session of interaction of the user of the data processing device of FIG. 1 and FIG. 3 via the generative AI interface of FIG. 4 compared to the interaction thereof in FIG. 4, according to one or more embodiments.

In one or more embodiments, the matching process discussed above may also meticulously curate advertisements (e.g., associated with advertisement campaign data 310) to align with query 404. For example, a query 404 about travel recommendations may trigger personalized advertising content 302 from local tourism boards and/or travel agencies. FIG. 5 shows a more interactive session of interaction of user 140₃ via generative AI interface 402. Here, response 410 may be a subset of responses 502 (e.g., also stored in memory 114₁) within generative AI interface 402 and query 404 may be a subset of queries 504 (e.g., also stored in memory 114₁). Each query 504 of queries 504 following an initial query 504 (e.g., query 404) may represent a progression of the interaction and may be input by user 140₃ based on a response 502 to a previous query 504. Here, the matching process discussed above based on the extraction/determination of context 206 from a query 504 may embed personalized advertising content 302 during the interaction in the form of verbal suggestions (e.g., "Please check out the ABC store at Memorial Dr, Bethlehem, PA for great deals in winter clothing" to a query 504 about hacks for surviving cold winters) and/or embedded video content. Thus, in one or more embodiments, the advertising experience may be more seamless and/or integrated to a user 140₃ within public engagement computing system 100. In one or more embodiments, a computing platform provided through public engagement computing system 100 may thus integrate targeted advertising into a generative AI response system via generative AI interface 402.

Again, as discussed above, by aligning personalized advertising content 302 to determined interests (e.g., derivable from context 206) and current location 230, public engagement computing system 100 may provide for a more relevant and/or engaging advertising experience. In the case of entity 190 being a service provider of AI interactions based on execution of ML and/or generative AI algorithms 170 on data processing device 102₁, a new revenue stream for said service provider may be opened up through public engagement computing system 100 that allows for effective monetization of AI interactions. In one or more embodiments, advertising entities 304 represented by data processing devices 102₇₋₈ may benefit from the highly targeted advertising discussed above to reach audiences more likely to be interested in products and/or services thereof.

As discussed above, in one or more embodiments, in customer service scenarios, ML and/or generative AI algorithms 170 may suggest product and/or services related to query 504 of the user (e.g., user 140₃, customer interacting via generative AI interface 402). In one or more embodiments, for content creators seeking inspiration and/or specific information by way of queries 504 (e.g., query 404), personalized advertising content 302 may provide tools, services and/or products relative to the creative context (e.g., context 206) extracted through ML and/or generative AI algorithms 170. In yet another example, an education related query 504 may be paired with personalized advertising content 302 for books, courses and/or learning tools. All reasonable variations are within the scope of the exemplary embodiments discussed herein.

Figure 6:
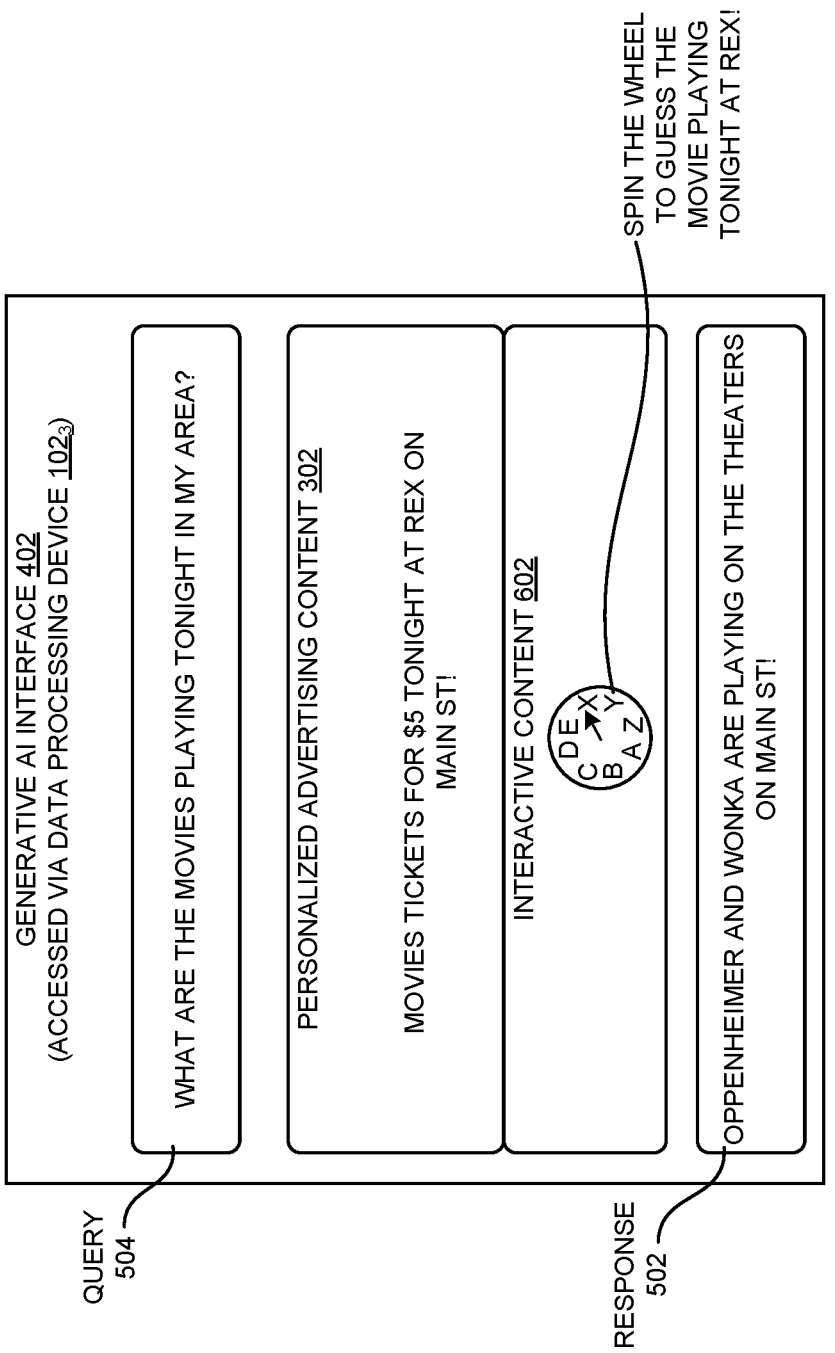
FIG. 6 is a schematic and an illustrative view of a design of an interactive user experience via the generative AI interface of FIG. 4, according to one or more embodiments.

In one or more embodiments, the execution of ML and/or generative AI algorithms 170 may personalize advertisements (e.g., personalized advertising content 302) not just based on current location 230 and query 504/context 206, but also based on user behavior and preferences over time. In one or more embodiments, the aforementioned may even involve analyzing past queries (e.g., past queries 506 that are part of historical data 232/user-specific data 234 along with user preference settings 412) to predict future interests (e.g., predicted data 508 that is also part of user-specific data 234). FIG. 6 shows designing an interactive experience via generative AI interface 402, according to one or more embodiments. Here, in one or more embodiments, personalized advertising content 302 may additionally have a constituent interactive content 602 therein that is related to the product and/or the service advertised therethrough. User 140₃ may, for example, engage directly with interactive content 602 of personalized advertising content 302. Examples of interactive content 602 may include but are not limited to mini-games, quizzes and/or polls related to the product and/or the service advertised through personalized advertising content 302. In some implementations, interactive element 602 may be dynamically rendered based on relation thereof to personalized advertising content 302. All reasonable variations are within the scope of the exemplary embodiments discussed herein.

In one or more embodiments, intelligent suggestions of products and/or services may be embedded within interactive AI interface 402/the conversation therein; a knowledgeable assistant, therefore, may be implemented through the execution of ML and/or generative AI algorithms 170 at the backend. For example, if user 140₃ queries (e.g., query 504) interactive AI interface 402 about baking, ML and/or generative AI algorithms 170 (or the engines within) may suggest a popular new mixer and/or a trending baking recipe book.

In one or more embodiments, user 140₃ may opt for longer advertisements (e.g., through personalized advertising content 302) in exchange for rewards such as AI service credits, extra features, discounts on premium features and/or coupons (e.g., coupons for products to be featured in advertisements) utilizable/realizable via public engagement computing system 100. In one or more embodiments, for users (e.g., user 140₃) with Augmented Reality (AR)-capable devices, the advertisements (e.g., personalized advertising content 302) may be presented in immersive AR formats that allow for a virtual "try-on" or interactive exploration of products and/or services discussed herein.

In one or more embodiments, in addition to deriving context 206 from email 202, queries 504 and/or related text data, context 206 may be derived from voice data and/or video data (e.g., part of structured and/or unstructured data 210 as voice data 236 and video data 238 as shown in FIG. 2) based on implementation of voice and/or mood recognition through ML and/or generative AI algorithms 170. In one or more embodiments, advertisements (e.g., personalized advertising content 302) may, thus, also be tailored to a current mood and/or a voice tone of user 140₃. Further, in one or more embodiments, advertisements may not only be location-specific but also adaptable to a context 206 that is culturally and/or linguistically resonant with user 140₃.

In one or more embodiments, user 140₃ may opt (e.g., via tweaking user preference settings 412) to receive advertisements from eco-friendly and/or socially responsible brands, thereby providing for aligned values and/or preferences between user 140₃ and said brands. In implementation-specific embodiments, recognizing the importance of timely information, advertisements may be rendered (e.g., within generative AI interface 402, application interface 350) with an emergency pause feature to allow user 140₃ to bypass the advertisements in adverse/urgent situations (e.g., based on determining context 206). In one or more embodiments, public engagement computing system 100 may be amenable to partnerships with educational institutions that provide educational content (e.g., content promoting learning and development) as advertisements. All reasonable variations are within the scope of the exemplary embodiments discussed herein.

In one or more embodiments, in case of health-related queries 504, ML and/or generative AI algorithms 170 may suggest wellness products, local health services and/or telemedicine options. In one or more embodiments, travel-related queries 504 may be responded to by showcasing virtual tours, local experiences and/or "hidden gems" in current location 230 and/or a queried location as part of personalized advertising content 302. In one or more embodiments, in the scenario of career advice queries 504, advertisements for online courses, professional workshops and/or networking events may be served as part of personalized advertising content 302. Thus, in one or more embodiments, the advertising contexts realizable through public engagement computing system 100 may place public engagement computing system 100 at the forefront of advertising technology that seamlessly blends AI-powered interactional/conversational interfaces with dynamic, targeted/user-focused advertising; this may revolutionize user interaction with brands, products and/or services.

In one example scenario of hyperlocal advertising enabled through public engagement computing system 100, a query 504 such as "Where is the best pizza place nearby?" may prompt personalized advertising content 302 relevant to a local pizzeria. A query 504 about local fitness centers may lead to personalized advertising content 302 relevant to nearby gyms and/or health clubs. In one or more embodiments, ML and/or generative AI algorithms 170 may integrate advertising seamlessly into user interaction via generative AI interface 402, thereby creating new avenues for hyperlocal marketing. In the case of entity 190 being a city council, local businesses may be advertised through public engagement computing system 100, thereby enhancing possibilities of local economic development.

Variants may include but are not limited to incorporating a number of advertisements (e.g., including personalized advertising content 302) into responses 502 as suggested advertisements. In an example scenario where user 140₃ queries (e.g., query 504) about home gardening, personalized advertising content 302 related to a local nursery and/or a landscaping service may be triggered and/or rendered. In a conversational AI alternative, when user 140₃ queries (e.g., query 504) about weekend activities, the AI may verbally suggest visiting a new local exhibition followed by details thereof, thereby subtly integrating advertising into the conversation. Other examples of hyperlocal advertising scenarios may include but are not limited to:

(a) User 140₃ asking, "Where can I find Italian food nearby?" Here, before the AI answers, a 30 second advertisement for a new Italian restaurant that has recently opened in the area of user 140₃ may be displayed.

(b) User 140₃ asking "What are some good workout places around here?" Here public engagement computing system 100 may play an advertisement for a local gym offering a sign-up discount. The local gym may be tailored to the location (e.g., current location 230) of user 140₃.

(c) User 140₃ inquiring about home repair services may result in an advertisement from a nearby hardware store and/or a local contractor specializing in home renovations.

(d) User 140₃ asking "What events are happening this weekend?" may result in an advertisement for a local music festival and/or a community fair happening in a vicinity thereof.

(e) User 140₃ querying for the nearest pharmacy store may be presented with an advertisement for a local pharmacy chain that possibly highlights a special on wellness products.

(f) In a conversational AI model, while answering a query 504 about local educational institutions, the AI may suggest "You might also be interested in the new tutoring center that just has opened in the downtown. The center offers personalized learning programs for students."

These examples may demonstrate how public engagement computing system 100 can leverage user queries (e.g., queries 504) and location data (e.g., current location 230) to provide contextually relevant, hyperlocal advertisements, thereby enhancing the relevance and effectiveness of marketing efforts. Additional examples of the hyperlocal advertising may include but are not limited to:

(a) User 140₃ querying "Where can I buy unique gifts in town?" may be played an advertisement for a local boutique currently having a sale on artisanal products.

(b) User 140₃ querying "Where can I find a reliable used car dealer?" may trigger an advertisement for a nearby dealership with a special financing offer.

(c) In response to "Are there any art exhibitions this month?", user 140₃ may see an advertisement for a local art gallery showcasing regional artists.

(d) In response to a pet owner user 140₃ asking "What's the best veterinary clinic nearby?", an advertisement for a veterinary clinic offering a free first check-up for new clients may be rendered.

(e) While discussing local leisure activities, the AI might suggest, "If you enjoy reading, the bookstore on Main Street has a great selection of bestsellers and they are hosting a reading event this weekend."

(f) In response to "How can I improve my garden?", the AI may present an advertisement for a local landscaping service offering a free consultation.

In locations (e.g., not limited to local areas, zones, towns and cities; may geographically extend to larger entities such as states and even countries) with strong local advertising spends, complex examples may include but are not limited to:

(a) In response to "What are the best neighborhoods for families?", the AI may show an advertisement for a real estate agency specializing in family homes, and a virtual tour of a property in a family-friendly area.

(b) When user 140₃ inquires about car maintenance, an advertisement for a local auto repair shop offering a discount on services for first-time customers or seasonal maintenance packages may be displayed.

(c) When user 140₃ inquires about wellness retreats, the AI may display an advertisement for a luxury spa and wellness retreat including testimonials and sneak peeks into services thereof.

(d) In response to a question about finding luxury fashion stores, an advertisement related to a high-end local boutique that includes a fashion show clipping and/or an exclusive event invitation may be displayed.

(e) In response to "What are the top fine dining restaurants here?", user $140_3$ may be able to view an advertisement for a gourmet restaurant featuring an interview with a renowned chef and showcasing signature dishes.

(f) Asking about the best dermatologists in an area may lead to an advertisement for a dermatology clinic providing for advanced skin care treatments; the advertisement may also include patient success stories and/or free consultation offers.

These examples may reflect the use of public engagement computing system 100 in sectors where local advertising spends are significant; here, complex and engaging advertisements may be tailored to queries 504 from users (e.g., user $140_3$) and/or preferences (e.g., from context 206) thereof.

Figure 7:
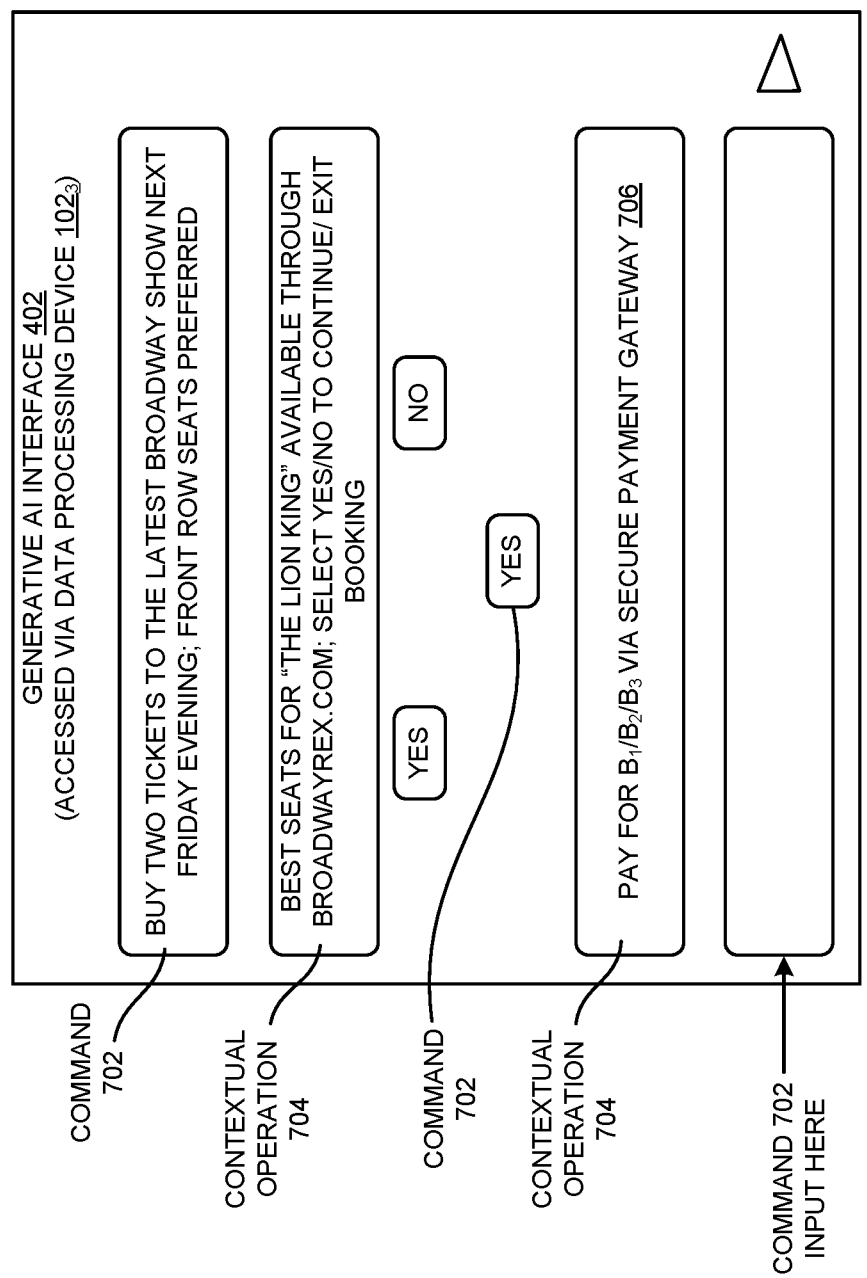
FIG. 7 is a schematic and an illustrative view of employment of the public engagement computing system of FIG. 1 toward extending capabilities of a query-based generative AI system implemented via the ML and/or the generative AI based algorithms of FIGS. 1-2 and the generative AI interface of FIG. 4 to include electronic commerce transactions, according to one or more embodiments.

FIG. 7 shows the employment of public engagement computing system 100 toward extending capabilities of query-based generative AI systems to include electronic commerce (e-commerce) transactions, according to one or more embodiments. Example of relevant e-commerce transactions may include but are not limited to purchasing tickets and selecting seats for theater shows. Here, the AI (e.g., implemented through ML and/or generative AI algorithms 170) may act as a personal concierge to enable efficient and/or secure handling of online shopping tasks. As shown in FIG. 7, user $140_3$ may input a command 702 (e.g., also may be interpretable through ML and/or generative AI algorithms 170 analogous to queries 504) such as "Buy two tickets to the latest Broadway show next Friday evening; front row seats preferred" via generative AI interface 402. Here, following extraction of context 206 and current location 230, ML and/or generative AI algorithms 170 may execute the aforementioned complex multi-part tasks (e.g., as contextual operations 704) instead of triggering the rendering of personalized advertising content 302. In some embodiments, the generation (e.g., based on the matching processes discussed above) and rendering of personalized advertising content 302 may be regarded as contextual operations 704.

As part of contextual operations 704, ML and/or generative AI algorithms 170 may navigate third-party websites (e.g., accessible through data processing devices $102_{1-N}$) such as theater booking platforms to find and select the best available seats according to the preferences of user $140_3$. In one or more embodiments, ML and/or generative AI algorithms 170 may integrate a secure payment gateway 706 (e.g., also implemented through one or more data processing devices $102_{1-N}$) to allow user $140_3$ to safety use credit and/or debit cards and/or electronic wallets thereof for transactions. In one or more embodiments, ML and/or generative AI algorithms 170 may cause secure storage of payment details and/or prompt for details during each transaction. Also, in one or more embodiments, ML and/or generative AI algorithms 170 may continuously monitor seat availability and make quick decisions to secure the best seats as soon as they become available.

In one or more implementations, ML and/or generative AI algorithms 170 may send a confirmation message to user $140_3$ via generative AI interface 402, along with e-tickets and/or instructions for ticket collection. As part of user preference settings 412, preferences including but not limited to favorite theaters, seating preferences and budget limits may be set in a profile (e.g., associated with user-profile data 406) of user $140_3$. These may be leveraged by the AI to tailor a search thereof and/or transaction processes (e.g., part of contextual operations 704).

In one or more embodiments, advanced security measures such as encryption and multi-factor authentication may be employed by ML and/or generative AI algorithms 170 to protect user data and/or prevent unauthorized transactions. In one or more embodiments, the AI may be designed to be accessible, with voice command capabilities and/or screen reader support for visually impaired users (e.g., user $140_3$). In one or more implementations, for queries 504 and/or commands 702 that the AI cannot resolve and/or understand, seamless integration with human customer support may be provided.

Applications may include but are not limited to:

(a) Entertainment ticketing: For purchasing tickets to movies, theater shows, concerts and/or sporting events.

(b) Travel bookings: Booking flights, hotels and/or rental cars with specific preferences.

(c) Event planning: Organizing event attendance, including purchasing tickets, booking venues and/or arranging transportation.

In one or more embodiments, within the context of AI-powered e-commerce, public engagement computing system 100 may provide user $140_3$ with a convenient, secure and highly personalized online shopping experience by combining the efficiency of AI with a nuanced understanding of human preferences to revolutionize online transactions. In one or more embodiments, the AI may revolutionize hyperlocal shopping experiences by integrating query-based generative AI with e-commerce capabilities. Acting as a virtual concierge, the AI may assist users (e.g., including user $140_3$) in making localized online purchases, from ordering food from neighborhood restaurants to booking tickets for local events.

Another example scenario may include, in response to command 702 from user $140_3$ such as "Order a vegetarian pizza from the best pizzeria within five miles," ML and/or generative AI algorithms 170 understanding context 206 from command 702 and determining current location 230 prior to executing the requisite task as a contextual operation 704. In one or more embodiments, as public engagement computing system 100 may facilitate seamless interaction with local business websites, support to community-based enterprises may be ensured in accordance with the hyperlocalization. Again, in one or more embodiments, a secure payment system (e.g., analogous to payment through payment gateway 706) tailored toward small local businesses may be incorporated within public engagement computing system 100.

Further, as implied above, user preferences (e.g., user preference settings 412) and/or past interactions (e.g., from historical data 232) by way of queries 504, emails (e.g., analogous to email 202) and/or commands (e.g., analogous to command 702) may be leveraged to suggest local shops and/or services. In one or more implementations, real-time local inventory checks may be performed to provide for constant updates on product availability from local stores. Orders may be confirmed and/or options may be provided for pickup and/or delivery of the products and/or services associated therewith. User preference settings 412 may be automatically tailored toward preferences for local stores, cuisines and/or services. The aforementioned contexts may be integrated with hyperlocal advertisement suggestions (e.g., contextual operations 704) during conversations such as those that promote a nearby café's specialty items when coffee options are being discussed via generative AI interface 402. Based on accessibility features and/or local language supports, inclusivity for all community members may be ensured. Again, users (e.g., user $140_3$) may be connected to human customer support from local businesses.

Applications may include but are not limited to local food ordering from nearby restaurants, cafes and/or outlets, community event ticketing for local theater, school events and/or community gathering, and/or neighborhood retail shopping to encourage support for local businesses, services and/or artisans. Thus, in one or more embodiments, public engagement computing system 100 may enhance a local shopping experience by bridging the gap between community members and local businesses, thereby fostering a strong, interconnected local economy.

It should be noted that public engagement computing system 100 may employ advanced generative AI to create highly personalized advertising content 302 and, to generalize, execute highly personalized contextual operations 704. Based on the complexity of ML and/or generative AI algorithms 170 implemented therein, interactions of users with government agencies, businesses and/or outlets may not just be contextually relevant (e.g., based on a comprehensive understanding of user needs and/or user contents) but also geographically specific, thereby ensuring that local and/or region-specific opportunities are capitalized upon effectively. Further, it should be noted that ML and/or generative AI algorithms 170 may be capable of structuring (e.g., based on training of ML and/or generative AI algorithms 170) inputs such as emails 202, queries 504 and commands 702. In addition, ML and/or generative AI algorithms 170 may reduce complexity of structured and/or unstructured data 210 by, in addition to or instead of, capturing simplified representations thereof.

In public engagement, public service, local business and/or e-commerce contexts, in one or more embodiments, ML and/or generative AI algorithms 170 may provide public engagement computing system 100 with a capability to consolidate various forms of public inputs such as emails (e.g., email 202), voice data (e.g., voice data 236 such as spoken comments), video data (e.g., video data 238), commands (e.g., commands 702) and/or queries (e.g., queries 504) into an integrated computing platform (e.g., data processing device $102_1$ executing ML and/or generative AI algorithms 170) with the necessary intelligence to sophisticatedly extract context 206 and provide for contextual and hyperlocal operations (e.g., contextual operations 704). All reasonable variations are within the scope of the exemplary embodiments discussed herein.

FIG. 8 shows a process flow diagram detailing the operations involved in contextual and user location based operational execution via a generative AI computing platform (e.g., public engagement computing system 100, data processing device $102_1$) in response to user interaction therewith, according to one or more embodiments. In one or more embodiments, operation 802 may involve determining context (e.g., context 206) relevant to an interaction of a user (e.g., user $140_3$) with the generative AI computing platform from an input (e.g., email 202, query 404/504, command 702) to the generative AI computing platform indicative of the interaction of the user. In one or more embodiments, operation 804 may involve determining, in addition to the context, a current location (e.g., current location 230) of the user from the input (e.g., IP address 228 associated with email 202), data (e.g., attachment 226) associated with the input and/or metadata (e.g., metadata 218 such as postal address 222 and/or zip code 224) of the user outside the input and the data associated with the input.

In one or more embodiments, operation 806 may then involve automatically executing one or more operation(s) (e.g., contextual operations 704 such as rendering personalized advertising content 302 and the e-commerce operations discussed above with regard to FIGS. 6-7) contextually relevant to and reflective of the determined context and the determined current location of the user as associated with a response to the interaction of the user.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium such as a Compact Disc (CD), a Digital Video Disc (DVD), a hard drive). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., public engagement computing system 100, data processing devices $102_{1-N}$). Accordingly, the specification and drawings are to be regarded in an illustrative rather than a restrictive sense.

The invention claimed is:

1. A method of a generative Artificial Intelligence (AI) computing platform implemented using a processor communicatively coupled to a memory, comprising:

determining context relevant to an interaction of a user with the generative AI computing platform from an input to the generative AI computing platform indicative of the interaction of the user,
   wherein the input comprises at least one of: an electronic mail transmitted by the user through an interface of a city council website to a representative of a city council, and
   wherein the user is a resident of a locality associated with a jurisdiction of the city council, and a query submitted by the user through a generative AI interface provided by the city council;

determining, in addition to the context, a current location of the user from at least one of: the input, data associated with the input and metadata of the user outside the input and the data associated with the input, wherein the metadata comprises at least one of postal address data, zip code data, Internet Protocol (IP) address data, and user-specific data associated with the city council website; and automatically executing at least one operation contextually relevant to and reflective of the determined context and the determined current location of the user as associated with a response to the interaction of the user, wherein the at least one operation comprises rendering, via a user interface of the city council website or the generative AI interface, content responsive to a civic issue associated with governance by the city council and geographically relevant to the current location of the user.

2. The method of claim 1, comprising at least one of:

the input being at least one of: an electronic mail from the user, a query through a generative AI interface provided through the generative AI computing platform accessed by the user via a data processing device thereof;

the data associated with the input being an attachment to the electronic mail;

determining the current location of the user from the at least one of: the input, the data associated with the input and the metadata of the user outside the input and the data associated with the input comprising determining the current location from at least one of: postal address data, zip code data and Internet Protocol (IP) address data; and determining the context comprises analyzing the text of the electronic mail or the query using a Natural Language Processing (NLP) engine implemented as part of the generative AI computing platform.

3. The method of claim 1, wherein automatically executing the at least one operation contextually relevant to and reflective of the determined context and the determined current location of the user further comprises rendering, via the user interface of the city council generative AI interface, content reflective of the determined context and the determined current location of the user.

4. The method of claim 3, further comprising matching the determined context and the determined current location of the user across the generative AI computing platform to determine the content to be rendered on the user interface.

5. The method of claim 3, further comprising additionally rendering interactive content associated with the content on the user interface to facilitate engagement of the user directly therewith.

6. The method of claim 3, comprising rendering the content on the user interface one of: during generation of the response to the user, prior to the generation of the response to the user and after the generation of the response to the user.

7. The method of claim 1, further comprising, as part of determining the context, refining the context based on access of historical data reflective of past interactions of the user with the generative AI computing platform analogous to the interaction of the user.

8. The method of claim 1, wherein determining the context further comprises performing sentiment analysis on the input based on training the generative AI computing platform with data analogous to the input.

9. A data processing device comprising:

a memory comprising instructions associated with a generative AI computing platform stored therein; and processor communicatively coupled to the memory, the processor executing the instructions associated with the generative AI computing platform to:

determine context relevant to an interaction of a user with the generative AI computing platform from an input to the generative AI computing platform indicative of the interaction of the user, wherein the input comprises at least one of: an electron ail transmitted by the user through an interface of a city council website to a representative of a city council, and wherein the user is a resident of a locality associated with a jurisdiction of the city council, and a query submitted by the user through a generative AI interface provided by the city council, determine, in addition to the context, a current location of the user from at least one of: the input, data associated with the input and metadata of the user outside the input and the data associated with the input, wherein the metadata comprises at least one of postal address data, zip code data, Internet Protocol (IP) address data, and user-specific data associated with the city council website, and automatically execute at least one operation contextually relevant to and reflective of the determined context and the determined current location of the user as associated with a response to the interaction of the user, wherein the at least one operation comprises rendering, via a user interface of the city council website or the generative AI interface, content to a civic issue associated with the city council and geographically relevant to the current location of the user.

10. The data processing device of claim 9, wherein the processor executes the instructions associated with the generative AI computing platform to at least one of:

receive at least one of: an electronic mail from the user, a query through a generative AI interface provided through the generative AI computing platform sed by the user via a data processing device thereof, receive the data associated with the input as an attachment to the electronic mail, and determine the current location of the user from the at least one of: the input, the data associated with the input and the metadata of the user outside the input and the data associated with the input based on determining the current location from at least one of: postal address data, zip code data and IP address data.

11. The data processing device of claim 9, wherein the processor executes the instructions associated with the generative AI computing platform to automatically execute the at least one operation contextually relevant to and reflective of the determined context and the determined current location of the user based on rendering, via the user interface of the city council website or the generative AI interface, content reflective of the determined context and the determined current location of the user as the at least one operation.

12. The data processing device of claim 11, wherein the processor further executes the instructions associated with the generative AI computing platform to additionally render interactive content associated with the content on the user interface to facilitate engagement of the user directly therewith.

13. The data processing device of claim 11, wherein the processor further executes the instructions associated with the generative AI computing platform to render the content on the user interface one of: during generation of the response to user, prior to the generation of the response to the user and after the generation of the response to the user.

14. The data processing device of claim 9, wherein the processor further executes the instructions associated with the generative AI computing platform to, as part of determining the context, refine the context based on access of historical data reflective of past interactions of the user with the generative AI computing platform analogous to the interaction of the user.

15. The data processing device of claim 9, wherein the processor furth er executes the instructions associated with the generative AI computing platform to determine the context based on performing sentiment analysis on the input in accordance with training the generative AI computing platform with data analogous to the input.

16. A system comprising:

at least one server executing a generative AI computing platform thereon; and a data processing device communicatively coupled to the at least one server through a computer network, wherein, as associated with a response to an input to the generative AI computing platform indicative of an interaction of a user of the data processing device therewith, the generative AI computing platform:

determines context relevant to the interaction of the user with the generative AI computing platform from the input, wherein the input comprises at least one of: an electronic mail transmitted by the user through an interface of a city council website to a representative of a city council, and wherein the user is a resident of a locality associated with a jurisdiction of the city council, and a query submitted by the user through a generative AI interface provided by the city council, determines, in addition to the context, a current location of the user from at least one of: the input, data associated with the input and metadata of the user outside the input and the data associated with the input, wherein the metadata comprises at least one of postal address data, zip code data, Internet Protocol (IP) address data, and user profile data associated with the city council website, and automatically executes at least one operation contextually relevant to and reflective of the determined context and the determined current location of the user, wherein the at least one operation comprises rendering, via a user interface of the city council website or the generative AI interface, content responsive to a civic issue associated with the city council and geographically relevant to the current location of the user.

17. The system of claim 16, wherein at least one of:

the input is at least one of: an electronic mail from the user, a query through a generative AI interface provided through the generative AI computing platform accessed by the user via the data processing device thereof, the data associated with the input is an attachment to the electronic mail, and the generative AI computing platform determines the current location of the user from the at least one of: the input, the data associated with the input and the metadata of the user outside the input and the data associated with the input based on determining the current location from at least one of: postal address data, zip code data and IP address data.

18. The system of claim 16, wherein the generative AI computing platform automatically executes the at least one operation contextually relevant to and reflective of the determined context and the determined current location of the user in accordance with rendering, via the user interface of the city council website or the generative AI interface, content reflective of the determined context and the determined current location of the user.

19. The system of claim 18, wherein the generative AI computing platform matches the determined context and the determined current location of the user to determine the content to be rendered on the user interface.

20. The system of claim 18, wherein the generative AI computing platform additionally renders interactive content associated with the content on the user interface to facilitate engagement of the user directly therewith.

* * * * *